US009131569B2

(12) United States Patent
van de Ven et al.

(10) Patent No.: US 9,131,569 B2
(45) Date of Patent: *Sep. 8, 2015

(54) AC DRIVEN SOLID STATE LIGHTING APPARATUS WITH LED STRING INCLUDING SWITCHED SEGMENTS

(71) Applicant: Cree, Inc., Durham, NC (US)

(72) Inventors: Antony P. van de Ven, Sai Kung (HK); Terry Given, Papakura (NZ)

(73) Assignee: Cree, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,528

(22) Filed: Jun. 17, 2013

(65) Prior Publication Data

US 2013/0285564 A1    Oct. 31, 2013

Related U.S. Application Data

(63) Continuation of application No. 12/775,842, filed on May 7, 2010, now Pat. No. 8,476,836.

(51) Int. Cl.
| | |
|---|---|
| *H05B 37/00* | (2006.01) |
| *H05B 39/00* | (2006.01) |
| *H05B 41/00* | (2006.01) |
| *H05B 33/08* | (2006.01) |

(52) U.S. Cl.
CPC .......... *H05B 33/0818* (2013.01); *H05B 33/083* (2013.01); *H05B 33/0809* (2013.01); *H05B 33/0821* (2013.01); *H05B 33/0896* (2013.01)

(58) Field of Classification Search
None
See application file for complete search history.

(56) References Cited

U.S. PATENT DOCUMENTS

| | | | |
|---|---|---|---|
| 446,142 | A | 2/1891 | Martin |
| D188,916 | S | 9/1960 | Harling, Donald W. |
| D207,867 | S | 6/1967 | Pettengill |
| 3,560,728 | A | 2/1971 | Atkin |
| 3,638,042 | A | 1/1972 | Studtmann |
| 3,655,988 | A | 4/1972 | Nakamura et al. |

(Continued)

FOREIGN PATENT DOCUMENTS

| | | |
|---|---|---|
| CN | 1575623 A | 2/2005 |
| CN | 101137261 A | 3/2008 |

(Continued)

OTHER PUBLICATIONS

Chinese First Office Action Corresponding to Chinese Patent Application No. 201180022813.5; Date of Issuance: Feb. 25, 2014; Foreign Text, 16 Pages; English Translation Thereof, 5 Pages.

(Continued)

*Primary Examiner* — Anh Tran
(74) *Attorney, Agent, or Firm* — Myers Bigel Sibley & Sajovec, P.A.

(57) ABSTRACT

A diode selection circuit for a light emitting apparatus according to some embodiments includes a plurality of light emitting devices coupled in series. The diode selection circuit includes a comparator configured to receive a rectified AC input signal and a reference voltage and to generate a control signal in response to comparison of the rectified AC input signal with the reference voltage, a voltage controlled current source configured to supply a current to the plurality of light emitting diodes that is proportional to the rectified AC input signal, and a switch configured to receive the control signal and to shunt current away from at least one of the plurality of light emitting devices in response to the control signal.

15 Claims, 12 Drawing Sheets

(56) References Cited

U.S. PATENT DOCUMENTS

| | | |
|---|---|---|
| 3,755,697 A | 8/1973 | Miller |
| 3,787,752 A | 1/1974 | Delay |
| 3,913,098 A | 10/1975 | Nakamura et al. |
| 4,090,189 A | 5/1978 | Fisler |
| 4,504,776 A | 3/1985 | Haville |
| 4,717,868 A | 1/1988 | Peterson |
| 4,798,983 A * | 1/1989 | Mori .......................... 327/433 |
| 4,839,535 A * | 6/1989 | Miller .......................... 327/539 |
| 4,841,422 A | 6/1989 | Groh |
| 4,918,487 A | 4/1990 | Coulter, Jr. |
| 5,059,788 A | 10/1991 | Tashiro et al. |
| 5,059,890 A | 10/1991 | Yoshikawa et al. |
| 5,125,675 A | 6/1992 | Engelbrecht |
| 5,138,541 A | 8/1992 | Kano |
| 5,151,679 A | 9/1992 | Dimmick |
| 5,175,528 A | 12/1992 | Choi et al. |
| 5,334,916 A | 8/1994 | Noguchi |
| 5,345,167 A | 9/1994 | Hasegawa et al. |
| 5,357,120 A | 10/1994 | Mori |
| 5,397,938 A * | 3/1995 | Wilhelm et al. ............... 326/127 |
| 5,467,049 A | 11/1995 | Kida et al. |
| 5,504,448 A | 4/1996 | Bennett et al. |
| 5,528,467 A | 6/1996 | Jiang |
| 5,598,068 A | 1/1997 | Shirai |
| 5,631,190 A | 5/1997 | Negley |
| 5,646,760 A | 7/1997 | Kuijk et al. |
| 5,661,645 A | 8/1997 | Hochstein |
| D384,430 S | 9/1997 | Lecluze |
| 5,736,881 A | 4/1998 | Ortiz |
| 5,798,520 A | 8/1998 | Kuijk et al. |
| 5,803,579 A | 9/1998 | Turnbull et al. |
| D400,280 S | 10/1998 | Leen |
| 5,844,377 A | 12/1998 | Anderson et al. |
| 5,912,477 A | 6/1999 | Negley |
| 5,912,568 A | 6/1999 | Kiley |
| 5,929,568 A | 7/1999 | Eggers |
| 5,941,626 A | 8/1999 | Yamuro |
| D418,620 S | 1/2000 | Grossman |
| D425,024 S | 5/2000 | Klaus et al. |
| 6,079,852 A | 6/2000 | Kamaya et al. |
| 6,137,235 A | 10/2000 | Franck |
| 6,150,771 A | 11/2000 | Perry |
| 6,153,980 A | 11/2000 | Marshall et al. |
| 6,161,910 A | 12/2000 | Reisenauer et al. |
| D437,439 S | 2/2001 | Tang |
| 6,201,353 B1 | 3/2001 | Chang et al. |
| 6,222,172 B1 | 4/2001 | Fossum et al. |
| 6,264,354 B1 | 7/2001 | Motilal |
| 6,285,139 B1 | 9/2001 | Ghanem |
| 6,313,589 B1 | 11/2001 | Kobayashi et al. |
| 6,323,597 B1 | 11/2001 | Janning |
| 6,329,760 B1 | 12/2001 | Bebenroth |
| 6,329,764 B1 | 12/2001 | van de Ven |
| 6,340,868 B1 | 1/2002 | Lys et al. |
| 6,350,041 B1 | 2/2002 | Tarsa et al. |
| 6,362,578 B1 | 3/2002 | Swanson et al. |
| 6,388,393 B1 | 5/2002 | Illingworth |
| 6,400,101 B1 | 6/2002 | Biebl et al. |
| 6,411,155 B2 | 6/2002 | Pezzani |
| 6,441,558 B1 | 8/2002 | Muthu et al. |
| 6,498,440 B2 | 12/2002 | Stam et al. |
| 6,501,630 B1 | 12/2002 | Colclaser et al. |
| 6,515,434 B1 | 2/2003 | Biebl |
| 6,528,954 B1 | 3/2003 | Lys et al. |
| 6,556,067 B2 | 4/2003 | Henry |
| 6,577,072 B2 | 6/2003 | Saito et al. |
| 6,586,890 B2 | 7/2003 | Min et al. |
| 6,600,175 B1 | 7/2003 | Baretz et al. |
| 6,614,358 B1 | 9/2003 | Hutchison et al. |
| 6,630,801 B2 | 10/2003 | Schuurmans |
| 6,636,003 B2 | 10/2003 | Rahm et al. |
| 6,697,130 B2 | 2/2004 | Weindorf et al. |
| 6,724,376 B2 | 4/2004 | Sakura et al. |
| D490,181 S | 5/2004 | Redfern |
| 6,747,420 B2 | 6/2004 | Barth et al. |
| 6,753,661 B2 | 6/2004 | Muthu et al. |
| 6,755,550 B1 | 6/2004 | Lackey |
| 6,784,622 B2 | 8/2004 | Newman, Jr. et al. |
| 6,788,011 B2 | 9/2004 | Mueller et al. |
| 6,791,840 B2 | 9/2004 | Chun |
| 6,808,287 B2 | 10/2004 | Lebens et al. |
| 6,836,081 B2 | 12/2004 | Swanson et al. |
| 6,841,947 B2 | 1/2005 | Berg-johansen |
| 6,873,203 B1 | 3/2005 | Latham, II et al. |
| 6,885,035 B2 | 4/2005 | Bhat et al. |
| 6,987,787 B1 | 1/2006 | Mick |
| 6,995,518 B2 | 2/2006 | Havlik et al. |
| 6,998,594 B2 | 2/2006 | Gaines et al. |
| 7,014,341 B2 | 3/2006 | King et al. |
| 7,038,399 B2 | 5/2006 | Lys et al. |
| 7,067,995 B2 | 6/2006 | Gunter et al. |
| 7,071,762 B2 | 7/2006 | Xu et al. |
| 7,081,722 B1 | 7/2006 | Huynh et al. |
| 7,088,059 B2 | 8/2006 | McKinney et al. |
| 7,091,874 B2 | 8/2006 | Smithson |
| 7,108,238 B2 | 9/2006 | Gauci |
| 7,109,664 B2 | 9/2006 | Wu |
| 7,119,498 B2 | 10/2006 | Baldwin et al. |
| 7,144,140 B2 | 12/2006 | Sun et al. |
| 7,180,487 B2 | 2/2007 | Kamikawa et al. |
| 7,202,608 B2 | 4/2007 | Robinson et al. |
| 7,213,940 B1 | 5/2007 | Van de Ven et al. |
| 7,218,056 B1 | 5/2007 | Harwood |
| D544,979 S | 6/2007 | Hartmann et al. |
| 7,226,189 B2 | 6/2007 | Lee et al. |
| 7,233,831 B2 | 6/2007 | Blackwell |
| 7,271,545 B2 | 9/2007 | Hu et al. |
| 7,291,983 B2 | 11/2007 | Hu et al. |
| D557,853 S | 12/2007 | Sandell |
| D558,374 S | 12/2007 | Sandell |
| 7,307,391 B2 | 12/2007 | Shan |
| 7,344,275 B2 | 3/2008 | Allen et al. |
| 7,352,138 B2 | 4/2008 | Lys et al. |
| 7,358,679 B2 | 4/2008 | Lys et al. |
| 7,408,308 B2 | 8/2008 | Sawada et al. |
| D576,964 S | 9/2008 | Shaner |
| 7,427,838 B2 | 9/2008 | Hosoya |
| 7,432,668 B2 | 10/2008 | Zwanenburg et al. |
| 7,458,706 B1 | 12/2008 | Liu et al. |
| 7,513,639 B2 | 4/2009 | Wang |
| 7,515,128 B2 | 4/2009 | Dowling |
| 7,535,180 B2 | 5/2009 | Negley et al. |
| 7,566,154 B2 | 7/2009 | Gloisten et al. |
| 7,576,496 B2 | 8/2009 | Duggal et al. |
| 7,614,767 B2 | 11/2009 | Zulim et al. |
| 7,614,769 B2 | 11/2009 | Sell |
| 7,628,513 B2 | 12/2009 | Chiu |
| 7,637,635 B2 | 12/2009 | Xiao et al. |
| 7,649,326 B2 | 1/2010 | Johnson et al. |
| D610,291 S | 2/2010 | Yoshinobu et al. |
| 7,656,371 B2 | 2/2010 | Shimizu et al. |
| 7,677,767 B2 | 3/2010 | Chyn |
| 7,679,292 B2 | 3/2010 | Allen et al. |
| D618,376 S | 6/2010 | Redfern et al. |
| 7,758,223 B2 | 7/2010 | Osawa et al. |
| 7,780,318 B2 | 8/2010 | Xiao et al. |
| 7,804,256 B2 | 9/2010 | Melanson |
| D625,038 S | 10/2010 | Yoo |
| 7,812,553 B2 | 10/2010 | Kang et al. |
| 7,821,023 B2 | 10/2010 | Yuan et al. |
| 7,821,194 B2 | 10/2010 | Negley et al. |
| D627,502 S | 11/2010 | Zheng et al. |
| D627,911 S | 11/2010 | Mo et al. |
| 7,824,075 B2 | 11/2010 | Maxik |
| 7,862,201 B2 | 1/2011 | Ge et al. |
| 7,862,214 B2 | 1/2011 | Trott et al. |
| D633,099 S | 2/2011 | Van de Ven et al. |
| 7,914,902 B2 | 3/2011 | Kao et al. |
| D636,921 S | 4/2011 | Van de Ven et al. |
| D636,922 S | 4/2011 | Yoshida et al. |
| D638,160 S | 5/2011 | Van de Ven et al. |
| 7,967,652 B2 | 6/2011 | Emerson |
| 7,994,725 B2 | 8/2011 | Bouchard |
| 8,008,845 B2 | 8/2011 | Van de Ven |

(56) References Cited

U.S. PATENT DOCUMENTS

| | | |
|---|---|---|
| D646,011 S | 9/2011 | Rashida |
| 8,157,422 B2 | 4/2012 | Paik et al. |
| 8,174,201 B2 | 5/2012 | Lee |
| 8,235,555 B2 | 8/2012 | Thomas et al. |
| 8,519,630 B2 | 8/2013 | Wang et al. |
| 8,791,641 B2 | 7/2014 | van de Ven et al. |
| 8,970,131 B2 | 3/2015 | Brandes et al. |
| 2001/0032985 A1 | 10/2001 | Bhat et al. |
| 2002/0027453 A1 | 3/2002 | Kulhalli et al. |
| 2002/0043943 A1 | 4/2002 | Menzer et al. |
| 2002/0047624 A1 | 4/2002 | Stam et al. |
| 2002/0063534 A1 | 5/2002 | Min |
| 2002/0070914 A1 | 6/2002 | Bruning et al. |
| 2002/0097095 A1 | 7/2002 | Jeon et al. |
| 2002/0139987 A1 | 10/2002 | Collins, III et al. |
| 2004/0036418 A1 | 2/2004 | Rooke et al. |
| 2004/0042205 A1 | 3/2004 | Tanabe et al. |
| 2004/0046510 A1 | 3/2004 | Allen |
| 2004/0208009 A1 | 10/2004 | Mardon et al. |
| 2004/0208809 A1 | 10/2004 | DAlesandro ET AL |
| 2004/0233145 A1 | 11/2004 | Chiang |
| 2005/0007164 A1 | 1/2005 | Callahan, Jr. ................ 327/133 |
| 2005/0057179 A1 | 3/2005 | Madhani et al. |
| 2005/0111222 A1 | 5/2005 | Olsson et al. |
| 2005/0128752 A1 | 6/2005 | Ewington et al. |
| 2005/0140282 A1 | 6/2005 | Park et al. |
| 2005/0169015 A1 | 8/2005 | Luk et al. |
| 2005/0174065 A1 | 8/2005 | Janning |
| 2005/0242742 A1 | 11/2005 | Cheang et al. |
| 2005/0254234 A1 | 11/2005 | Wang |
| 2005/0276053 A1 | 12/2005 | Nortrup et al. |
| 2005/0280376 A1 | 12/2005 | Hamidian et al. |
| 2006/0018664 A1 | 1/2006 | Levinson et al. |
| 2006/0049782 A1 | 3/2006 | Vornsand et al. |
| 2006/0060882 A1 | 3/2006 | Ohe et al. |
| 2006/0153511 A1 | 7/2006 | Franklin et al. |
| 2006/0176411 A1 | 8/2006 | Furukawa |
| 2006/0221609 A1 | 10/2006 | Ryan |
| 2006/0238465 A1 | 10/2006 | Kurumisawa |
| 2006/0244396 A1 | 11/2006 | Bucur |
| 2006/0261754 A1 | 11/2006 | Lee |
| 2007/0018594 A1 | 1/2007 | Janning |
| 2007/0040512 A1 | 2/2007 | Jungwirth et al. |
| 2007/0096661 A1 | 5/2007 | Allen |
| 2007/0108843 A1 | 5/2007 | Preston et al. |
| 2007/0115228 A1 | 5/2007 | Roberts et al. |
| 2007/0115662 A1 | 5/2007 | Roberts et al. |
| 2007/0137074 A1 | 6/2007 | Van de Ven |
| 2007/0139920 A1 | 6/2007 | Van de Ven |
| 2007/0139923 A1 | 6/2007 | Negley |
| 2007/0170447 A1 | 7/2007 | Negley |
| 2007/0171145 A1 | 7/2007 | Coleman |
| 2007/0182338 A1 | 8/2007 | Shteynberg et al. |
| 2007/0182346 A1 | 8/2007 | Shteynberg et al. |
| 2007/0182347 A1 | 8/2007 | Shteynberg et al. |
| 2007/0195023 A1 | 8/2007 | Kang et al. |
| 2007/0215027 A1 | 9/2007 | MacDonald et al. |
| 2007/0236911 A1 | 10/2007 | Negley |
| 2007/0236920 A1 | 10/2007 | Snyder |
| 2007/0247414 A1 | 10/2007 | Roberts |
| 2007/0257623 A1 | 11/2007 | Johnson et al. |
| 2007/0257999 A1 | 11/2007 | Chou |
| 2007/0262724 A1 | 11/2007 | Mednik et al. |
| 2007/0263393 A1 | 11/2007 | Van de Ven |
| 2007/0267978 A1 | 11/2007 | Shteynberg et al. |
| 2007/0267983 A1 | 11/2007 | Van de Ven |
| 2007/0273299 A1 | 11/2007 | Miskin et al. |
| 2007/0274063 A1 | 11/2007 | Negley |
| 2007/0274080 A1 | 11/2007 | Negley |
| 2007/0278503 A1 | 12/2007 | Van de Ven |
| 2007/0278934 A1 | 12/2007 | Van de Ven |
| 2007/0278974 A1 | 12/2007 | van de Ven |
| 2007/0279440 A1 | 12/2007 | Negley |
| 2007/0279903 A1 | 12/2007 | Negley |
| 2007/0280624 A1 | 12/2007 | Negley |
| 2007/0285031 A1 | 12/2007 | Shteynberg et al. |
| 2008/0024071 A1 | 1/2008 | Yu |
| 2008/0030993 A1 | 2/2008 | Narendran et al. |
| 2008/0054281 A1 | 3/2008 | Narendran et al. |
| 2008/0062070 A1 | 3/2008 | De Oto et al. |
| 2008/0084685 A1 | 4/2008 | Van de Ven |
| 2008/0084700 A1 | 4/2008 | Van de Ven |
| 2008/0084701 A1 | 4/2008 | Van De Ven et al. |
| 2008/0088248 A1 | 4/2008 | Myers |
| 2008/0089053 A1 | 4/2008 | Negley |
| 2008/0089071 A1 | 4/2008 | Wang |
| 2008/0094000 A1* | 4/2008 | Yamamoto et al. ........... 315/250 |
| 2008/0094829 A1 | 4/2008 | Narendran et al. |
| 2008/0105887 A1 | 5/2008 | Narendran et al. |
| 2008/0106895 A1 | 5/2008 | Van de Ven |
| 2008/0106907 A1 | 5/2008 | Trott |
| 2008/0112168 A1 | 5/2008 | Pickard |
| 2008/0112170 A1 | 5/2008 | Trott |
| 2008/0112183 A1 | 5/2008 | Negley |
| 2008/0116818 A1 | 5/2008 | Shteynberg et al. |
| 2008/0117500 A1 | 5/2008 | Narendran et al. |
| 2008/0122376 A1 | 5/2008 | Lys |
| 2008/0128718 A1 | 6/2008 | Sumitani |
| 2008/0129220 A1 | 6/2008 | Shteynberg et al. |
| 2008/0130283 A1 | 6/2008 | Chang |
| 2008/0130285 A1 | 6/2008 | Negley |
| 2008/0136313 A1 | 6/2008 | Van de Ven |
| 2008/0137347 A1 | 6/2008 | Trott |
| 2008/0150440 A1 | 6/2008 | Hsu |
| 2008/0157688 A1 | 7/2008 | Gibboney |
| 2008/0186704 A1 | 8/2008 | Chou et al. |
| 2008/0203946 A1 | 8/2008 | Ito et al. |
| 2008/0211415 A1 | 9/2008 | Altamura |
| 2008/0215279 A1 | 9/2008 | Salsbury et al. |
| 2008/0252197 A1 | 10/2008 | Li et al. |
| 2008/0258628 A1 | 10/2008 | Higley et al. |
| 2008/0259589 A1 | 10/2008 | Van de Ven |
| 2008/0278928 A1 | 11/2008 | Van de Ven |
| 2008/0278940 A1 | 11/2008 | Van de Ven |
| 2008/0278950 A1 | 11/2008 | Pickard |
| 2008/0278952 A1 | 11/2008 | Trott |
| 2008/0278957 A1 | 11/2008 | Pickard |
| 2008/0304260 A1 | 12/2008 | Van de Ven |
| 2008/0304261 A1 | 12/2008 | Van de Ven |
| 2008/0304269 A1 | 12/2008 | Pickard |
| 2008/0309255 A1 | 12/2008 | Myers et al. |
| 2009/0015759 A1 | 1/2009 | Honbo |
| 2009/0034283 A1 | 2/2009 | Albright et al. |
| 2009/0039791 A1 | 2/2009 | Jones |
| 2009/0046464 A1 | 2/2009 | Liu et al. |
| 2009/0059582 A1 | 3/2009 | Kulkarni |
| 2009/0079355 A1 | 3/2009 | Zhou et al. |
| 2009/0079357 A1 | 3/2009 | Shteynberg et al. |
| 2009/0079358 A1 | 3/2009 | Shteynberg et al. |
| 2009/0079359 A1 | 3/2009 | Shteynberg et al. |
| 2009/0079360 A1 | 3/2009 | Shteynberg et al. |
| 2009/0079362 A1 | 3/2009 | Shteynberg et al. |
| 2009/0086474 A1 | 4/2009 | Chou |
| 2009/0094000 A1 | 4/2009 | Krishnamurthy et al. |
| 2009/0101930 A1 | 4/2009 | Li |
| 2009/0108269 A1 | 4/2009 | Negley |
| 2009/0140630 A1 | 6/2009 | Kijima et al. |
| 2009/0147517 A1 | 6/2009 | Li et al. |
| 2009/0160363 A1 | 6/2009 | Negley et al. |
| 2009/0161356 A1 | 6/2009 | Negley |
| 2009/0184616 A1 | 7/2009 | Van De Ven et al. |
| 2009/0184662 A1 | 7/2009 | Given |
| 2009/0184666 A1 | 7/2009 | Myers et al. |
| 2009/0195168 A1 | 8/2009 | Greenfeld |
| 2009/0251934 A1 | 10/2009 | Shteynberg et al. |
| 2009/0296384 A1 | 12/2009 | Van de Ven et al. |
| 2010/0026187 A1 | 2/2010 | Kelly et al. |
| 2010/0026208 A1 | 2/2010 | Shteynberg et al. |
| 2010/0045187 A1 | 2/2010 | Shteynberg et al. |
| 2010/0045210 A1 | 2/2010 | Hariharan |
| 2010/0060130 A1 | 3/2010 | Li |
| 2010/0060175 A1 | 3/2010 | Lethellier |
| 2010/0060181 A1 | 3/2010 | Choi et al. |
| 2010/0067227 A1 | 3/2010 | Budike |

(56) References Cited

U.S. PATENT DOCUMENTS

| | | |
|---|---|---|
| 2010/0072902 A1 | 3/2010 | Wendt et al. |
| 2010/0079059 A1 | 4/2010 | Roberts et al. |
| 2010/0079076 A1 | 4/2010 | Chang et al. |
| 2010/0079262 A1 | 4/2010 | Van Laanen ............ 340/310.12 |
| 2010/0090604 A1 | 4/2010 | Maruyama et al. |
| 2010/0102199 A1 | 4/2010 | Negley |
| 2010/0102697 A1 | 4/2010 | Van de Ven |
| 2010/0103678 A1 | 4/2010 | Van de Ven |
| 2010/0109560 A1 | 5/2010 | Yu et al. |
| 2010/0123403 A1 | 5/2010 | Reed |
| 2010/0134018 A1 | 6/2010 | Tziony et al. |
| 2010/0135016 A1 | 6/2010 | Ishibashi |
| 2010/0141159 A1 | 6/2010 | Shiu et al. |
| 2010/0156763 A1 | 6/2010 | Lee et al. |
| 2010/0177509 A1 | 7/2010 | Pickard |
| 2010/0194274 A1 | 8/2010 | Hoogzaad |
| 2010/0213859 A1 | 8/2010 | Shteynberg et al. |
| 2010/0225220 A1 | 9/2010 | Tanaka et al. |
| 2010/0231135 A1 | 9/2010 | Hum et al. |
| 2010/0246177 A1 | 9/2010 | Van de Ven |
| 2010/0259182 A1 | 10/2010 | Man et al. |
| 2010/0277084 A1 | 11/2010 | Lee et al. |
| 2010/0308738 A1 | 12/2010 | Shteynberg et al. |
| 2010/0308739 A1 | 12/2010 | Shteynberg et al. |
| 2011/0025217 A1 | 2/2011 | Zhan et al. |
| 2011/0031894 A1 | 2/2011 | Van de Ven |
| 2011/0057571 A1 | 3/2011 | Ackermann et al. |
| 2011/0068696 A1 | 3/2011 | van de Ven et al. |
| 2011/0068701 A1 | 3/2011 | van de Ven et al. |
| 2011/0068702 A1 | 3/2011 | van de Ven et al. |
| 2011/0074265 A1 | 3/2011 | Van de Ven |
| 2011/0074289 A1 | 3/2011 | Van de Ven |
| 2011/0075411 A1 | 3/2011 | Van de Ven et al. |
| 2011/0075414 A1 | 3/2011 | Van de Ven et al. |
| 2011/0075422 A1 | 3/2011 | Van de Ven et al. |
| 2011/0075423 A1 | 3/2011 | Van de Ven |
| 2011/0109228 A1 | 5/2011 | Shimomura et al. |
| 2011/0115394 A1 | 5/2011 | Shteynberg et al. |
| 2011/0115411 A1 | 5/2011 | Shteynberg et al. |
| 2011/0121754 A1 | 5/2011 | Shteynberg et al. |
| 2011/0198984 A1 | 8/2011 | Van De Ven |
| 2011/0211351 A1 | 9/2011 | Van de Ven |
| 2011/0227484 A1 | 9/2011 | Huynh |
| 2011/0227485 A1 | 9/2011 | Huynh |
| 2011/0227489 A1 | 9/2011 | Huynh |
| 2011/0227490 A1 | 9/2011 | Huynh |
| 2011/0273102 A1 | 11/2011 | van de Ven et al. |
| 2012/0091920 A1 | 4/2012 | Yang |
| 2012/0099321 A1 | 4/2012 | Scott et al. |
| 2012/0176826 A1 | 7/2012 | Lazar |
| 2012/0194073 A1 | 8/2012 | Wang et al. |
| 2012/0201025 A1 | 8/2012 | Cash |
| 2012/0306375 A1 | 12/2012 | Van De Ven |
| 2013/0002167 A1 | 1/2013 | Van de ven |
| 2013/0026923 A1 | 1/2013 | Athalye et al. |
| 2013/0069561 A1 | 3/2013 | Melanson et al. |
| 2013/0077299 A1 | 3/2013 | Hussell et al. |
| 2013/0207559 A1 | 8/2013 | Ferrier |
| 2013/0278157 A1 | 10/2013 | Radermacher |

FOREIGN PATENT DOCUMENTS

| | | |
|---|---|---|
| CN | 101668373 A | 3/2010 |
| CN | 101772245 A | 7/2010 |
| CN | 101779522 (A) | 7/2010 |
| CN | 101827481 A | 9/2010 |
| EP | 1 020 935 A2 | 7/2000 |
| EP | 1 594 348 A2 | 11/2005 |
| EP | 1 881 259 A1 | 1/2008 |
| JP | 59-113768 A | 6/1984 |
| JP | 4 196359 A | 7/1992 |
| JP | 2003-273404 A | 9/2003 |
| JP | 2005-310997 A | 11/2005 |
| JP | 2006-103404 A | 4/2006 |
| JP | 2006-332022 A | 12/2006 |
| JP | 2008-125339 A | 5/2008 |
| JP | 2008-205357 A | 9/2008 |
| JP | 2008-544569 A | 12/2008 |
| JP | 2009-016280 A | 1/2009 |
| JP | 2009-049010 A | 3/2009 |
| JP | 2010-092776 A | 4/2010 |
| TW | 512575 (B) | 12/2002 |
| WO | WO 03/037042 A1 | 5/2003 |
| WO | WO 2006/007388 A1 | 1/2006 |
| WO | WO 2006/018604 A1 | 2/2006 |
| WO | WO 2007/023454 A1 | 3/2007 |
| WO | WO 2008/036873 | 3/2008 |
| WO | WO 2008/051957 | 5/2008 |
| WO | WO 2008/061082 | 5/2008 |
| WO | WO 2008/129504 A1 | 10/2008 |
| WO | WO 2009/013676 A2 | 1/2009 |

OTHER PUBLICATIONS

European Extended Search Report Corresponding to European Application No. 11777867; Dated; May 13, 2014; 7 Pages.

Japanese Office Action Corresponding to Japanese Patent Application No. 2012-530920; Mailing Date: May 28, 2014; Foreign Text, 3 Pages; English Translation Thereof, 2 Pages.

International Search Report and The Written Opinion of the International Searching Authority Corresponding to International Application No. PCT/US2011/033736; Date of Mailing: Jul. 7, 2011; 10 pages.

U.S. Appl. No. 12/328,144, filed Dec. 4, 2008, Chobot.
U.S. Appl. No. 12/328,115, filed Dec. 4, 2008, Chobot.
U.S. Appl. No. 11/854,744, filed Sep. 13, 2007, Myers.
U.S. Appl. No. 60/844,325, filed Sep. 13, 2006, Myers.

"Assist Recommends . . . LED Life for General Lighting: Definition of Life", vol. 1, Issue 1, Feb. 2005.

"Bright Tomorrow Lighting Competition (L Prize™ )", May 28, 2008, Document No. 08NT006643.

"Energy Star® Program Requirements for Solid State Lighting Luminaires, Eligibility Criteria—Version 1.1", Final: Dec. 19, 2008.

Application Note: CLD-APO6.006, entitled Cree® XLamp® XR Family & 4550 LED Reliability, published at cree,com/xlamp, Sep. 2008.

Bulborama, Lighting Terms Reference and Glossary, http://www.bulborama.com/store/lightingreferenceglossary-13.html, 6 pages.

DuPont "DuPont$^{SM}$Diffuse Light Reflector", Publication K-20044, May 2008, 2 pages.

EXM020, Multi-Channel 160W LED Driver, Rev. 2,0 Nov. 2010, 13 pages, www.exclara.com.

EXM055, 14.8W Dimmable LED Ballast, Rev. 0.7, Mar. 11, 2011, 10 pages, www.exclara.com.

EXM057, 14.5W Dimmable LED Ballast, Rev. 0.5, Mar. 11, 2011, 8 pages, www.exclara.com.

Furukawa Electric Co., Ltd,, Data Sheet, "New Material for Illuminated Panels Microcellular Reflective Sheet MCPET", updated Apr. 8, 2008, 2 pages.

Global Patent Literature Text Search Corresponding to PCT Application No. PCT/US2011/38995; Date of Search: Sep. 8, 2011; 7 pages.

Illuminating Engineering Society Standard Lm-80-08, entitled "IES Approved Method for Measuring Lumen Maintenance of LED Light Sources", Sep. 22, 2008, ISBN No, 978-0-87995-227-3.

International Preliminary Report on Patentability Corresponding to International Application No. PCT/US2010/048567; Date of Mailing: Apr. 5, 2012; 10 pages.

International Preliminary Report on Patentability corresponding to International Application No, PCT/US2010/029897; Date of Mailing: Apr. 27, 2011; 14 pages.

International Search Report And The Written Opinion of the International Searching Authority Corresponding to International Application No. PCT/US2011/038995; Date of Mailing: Sep. 16, 2011; 9 pages.

International Search Report Corresponding to International Application No. PCT/US2010/049581; Date of Mailing: Nov. 23, 2010; 3 pages.

(56) References Cited

OTHER PUBLICATIONS

International Search Report Corresponding to International Application No. PCT/US11/54846; Date of Mailing: Jan. 23, 2012; 13 pages.
International Search Report Corresponding to International Application No. PCT/US2010/048567; Dated: Oct. 29, 2010.
Kim et al. "Strongly Enhanced Phosphor Efficiency in GaInN White Light-Emitting Diodes Using Remote Phosphor Configuration and Diffuse Reflector Cup" *Japanese Journal of Applied Physics* 44(21):L649-L651 (2005).
LEDs Magazine, Press Release May 23, 2007, "*Furukawa America Debuts MCPET Reflective Sheets to Improve Clarity, Efficiency of Lighting Fixtures*", downloaded Jun. 25, 2009 from http://www.ledsmagazine.com/press/15145, 2 pages.
MCPET—Microcellular Reflective Sheet Properties, http://www.trocellen.com, downloaded Jun. 25, 2009, 2 pages.
Notification of Transmittal of the International Search Report and the Written Opinion of the International Searching Authority, or the Declaration; International Search Report; and Written Opinion of the International Searching Authority, PCT Application No. PCT/US2010/037608, Jul. 30, 2010.
Notification of Transmittal of the International Search Report and the Written Opinion of the International Searching Authority, or the Declaration, International Search Report, and Written Opinion of the International Searching Authority, PCT International Application No.PCT/US2006/011820, Aug. 7, 2006.
Notification of transmittal of the international search report and the written opinion of the international searching authority, or declaration, PCT/US2010/029897, Jun. 23, 2010.
Notification of Transmittal of the International Search Report and the Written Opinion of the International Searching Authority, or the Declaration; International Search Report; Written Opinion of the International Searching Authority; Corresponding to International Application No. PCT/US2010/048225; Dated: Nov. 4, 2010; 11 pages.
Philips Lumileds, Technology White Paper: "Understanding power LED lifetime analysis", downloaded from http://www.philipslumileds.com/pdfs/WP12.pdf, Document No. WP12, Last Modified May 22, 2007.
Sutardja, P., "Design for High Quality and Low Cost SSL with Power Factor Correction", Marvell Semiconductor Inc. Jul. 2011, 16 pages.
International Search Report and Written Opinion for PCT Application No. PCT/US12/47643 mailed on Oct. 25, 2012,.
International Preliminary Report Corresponding to International Application No. PCT/US2011/033736; Date of Mailing: Nov. 22, 2012; 8 Pages.
International Search Report Corresponding to International Application No. PCT/US12/54888; Date of Mailing: Nov. 23, 2012; 12 Pages.
International Search Report Corresponding to International Application No, PCT/US12/54869; Date of Mailing: Nov. 23, 2012; 10 Pages.
Chinese Office Action Corresponding to Chinese Patent Application No. 2010-80053242.7;. Date of Issue: Nov. 27, 2013, Foreign Text, 16 Pages, English Translation, 35 Pages.
Notification Concerning Transmittal of Copy of International Preliminary Report on Patentability, Application No. PCT/US2010/048225, Date of Mailing: Feb. 27, 2014, 9 Pages.
Japanese Office Action Corresponding to Japanese Patent Application No. 2013-509109; Dispatch Date: Sep. 17, 2013; Foreign Text, 2 Pages, English Translation, 3 Pages.
Extended European Search Report corresponding to European Patent Application No. 10819249; Date of Mailing: Mar. 27, 2014, 8 pages.
Notification Concerning Transmittal of Copy of International Preliminary Report on Patentability, Application No. PCT/US2012/054869, Date of Mailing: Mar. 27, 2014, 8 pages.
Notification Concerning Transmittal of Copy of International Preliminary Report on Patentability, Application No. PCT/US2012/054888, Date of Mailing: Mar. 27, 2014, 10 pages.
Chinese Office Action issues on Nov. 3, 2014 for corresponding Application No. 201180004266.8 (4 pages).
Chinese Office Action Corresponding to Chinese Patent Application No. 201280044038.8; Date of Notification: Dec. 12, 2014; Foreign Text, 16 Pages, English Translation Thereof, 7 Pages.
Chinese Second Office Action Corresponding to Chinese Patent Application No. 201080053889.X; Date of Issue: Dec. 17, 2014; Foreign Text, 9 Pages, English Translation Thereof, 15 Pages.
International Search Report and Written Opinion for Corresponding PCT Application No. PCT/US2014/068534, mailed Mar. 4, 2015 (22 pages).
Chinese Office Action Corresponding to Chinese Patent Application No. 201280054168.X; Date of Notification: Feb. 12, 2015; Foreign Text, 8 Pages, English Translation Thereof, 8 Pages.
Search Report issued for corresponding Taiwan Patent Application No. 099131743, mailed May 20, 2015, 1 page.

\* cited by examiner

AC DRIVEN SOLID STATE LIGHTING APPARATUS WITH LED STRING INCLUDING SWITCHED SEGMENTS

RELATED APPLICATIONS

This application is a continuation of U.S. patent application Ser. No. 12/775,842 filed May 7, 2010, the disclosure of which is incorporated herein by reference in its entirety.

FIELD OF THE INVENTION

The present invention relates to solid state lighting, and more particularly to lighting fixtures including solid state lighting components:

BACKGROUND

Solid state lighting arrays are used for a number of lighting applications. For example, solid state lighting panels including arrays of solid state light emitting devices have been used as direct illumination sources, for example, in architectural and/or accent lighting. A solid state light emitting device may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid state light emitting device. Typically, a solid state light emitting device generates light through the recombination of electronic carriers, i.e. electrons and holes, in a light emitting layer or region.

Solid state lighting panels are commonly used as backlights for small liquid crystal display (LCD) screens, such as LCD display screens used in portable electronic devices. In addition, there has been increased interest in the use of solid state lighting panels as backlights for larger displays, such as LCD television displays.

For smaller LCD screens, backlight assemblies typically employ white LED lighting devices that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

The color rendering index (CRI) of a light source is an objective measure of the ability of the light generated by the source to accurately illuminate a broad range of colors. The color rendering index ranges from essentially zero for monochromatic sources to nearly 100 for incandescent sources. Light generated from a phosphor-based solid state light source may have a relatively low color rendering index.

For large-scale backlight and illumination applications, it is often desirable to provide a lighting source that generates a white light having a high color rendering index, so that objects and/or display screens illuminated by the lighting panel may appear more natural. Accordingly, to improve CRI, red light may be added to the white light, for example, by adding red emitting phosphor and/or red emitting devices to the apparatus. Other lighting sources may include red, green and blue light emitting devices. When red, green and blue light emitting devices are energized simultaneously, the resulting combined light may appear white, or nearly white, depending on the relative intensities of the red, green and blue sources.

Although solid state light sources having high CRI and/or high efficiency have been demonstrated, one problem with the large-scale adoption of such light sources in architectural applications is that solid state lighting devices are typically designed to be driven using direct current (DC) power, while electric power is distributed using alternating current (AC), which is more efficient for long distance power distribution. Typically, a solid state lighting source is provided or coupled with a power converter that converts AC power into DC power, and the DC power is used to energize the light source. However, the use of such power converters increases the cost of the lighting source and/or the overall installation, and introduces additional efficiency losses.

Some attempts at providing AC-driven solid state lighting sources have involved driving an LED or string or group of LEDs using a rectified AC waveform. However, because the LEDs require a minimum forward voltage to turn on, the LEDs may turn on for only a part of the rectified AC waveform, which may result in visible flickering, may undesirably lower the power factor of the system, and/or may increase resistive loss in the system.

Other attempts at providing AC-driven solid state lighting sources have involved placing LEDs in an anti-parallel configuration, so that half of the LEDs are driven on each half-cycle of an AC waveform. However, this approach requires twice as many LEDs to produce the same luminous flux as using a rectified AC signal.

SUMMARY

A circuit for a light emitting apparatus according to some embodiments includes a plurality of light emitting devices coupled in series. The circuit includes a comparator configured to receive a rectified AC input signal and a reference voltage and to generate a control signal in response to comparison of the rectified AC input signal with the reference voltage, a voltage controlled current source configured to supply a current to the plurality of light emitting diodes that is proportional to the rectified AC input signal, and a switch configured to receive the control signal and to shunt current away from at least one of the plurality of light emitting devices in response to the control signal.

The voltage controlled current source may include a first transistor, an emitter resistor coupled to an emitter of the first transistor, a diode coupled to a base of the first transistor, a first resistor coupled to a first terminal of the diode and a second resistor coupled to a second terminal of the diode, and a terminal configured to receive the rectified AC input signal coupled to the emitter resistor and to the first resistor. The diode may include a Zener diode.

A collector of the first transistor may be coupled to the series of light emitting devices.

In some embodiments, the circuit may further include a second transistor including a base coupled to a collector of the first transistor and a collector coupled to the emitter of the first transistor.

The circuit may further include an adjustable current sink coupled to the base of the first transistor. The adjustable current sink may include a third transistor having a collector coupled to the base of the first transistor and an emitter coupled to ground, and a diode coupled to a base of the third transistor. The base of the third transistor is configured to receive a pulse width modulation (PWM) control signal configured to control a conductivity of the third transistor.

The circuit may be configured to shunt current away from the at least one light emitting device in response to a level of the rectified AC input signal being below a threshold level.

The switch may include a field effect transistor, and the control signal may be applied to a gate of the field effect transistor.

The switch may further include a second transistor coupled in a cascode configuration with the field effect transistor so that conductivity of the second transistor may be controlled by the field effect transistor.

The second transistor may include a bipolar transistor including a base, a collector and an emitter, and a drain of the field effect transistor may be coupled to the emitter of the bipolar transistor, and the collector of the bipolar transistor may be coupled to an anode of the at least one light emitting device.

The circuit may further include a resistor coupled between the drain of the field effect transistor and the emitter of the bipolar transistor.

The diode selection circuit may further include a voltage divider ladder configured to generate a plurality of reference voltages, a plurality of comparators configured to receive the rectified AC input signal and a respective one of the plurality of reference voltages and to generate respective control signals in response to comparison of the rectified AC input signal with the respective reference voltages, and a plurality of switches configured to receive respective ones of the control signals and to shunt current away from respective ones of the plurality of light emitting devices in response to the control signals.

The switch may include a field effect transistor including a gate terminal and source/drain terminals, one of the source/drain terminals may be coupled to an anode of the at least one light emitting device and another of the source/drain terminals may be coupled to an cathode of the at least one light emitting device.

The circuit may further include a slew rate control capacitor coupled between the gate terminal of the field effect transistor and the anode of the at least one light emitting device.

The circuit may further include a voltage divider ladder configured to generate a plurality of reference voltages, a plurality of comparators configured to receive the rectified AC input signal and a respective one of the plurality of reference voltages and to generate respective control signals in response to comparison of the rectified AC input signal with the respective reference voltages, and a plurality of switches configured to receive respective ones of the control signals and to shunt current away from respective ones of the plurality of light emitting devices in response to the control signals.

The switch may include a bipolar transistor including a base coupled to an output of the comparator and having an emitter coupled to ground and a collector coupled to an anode of the at least one light emitting device.

A lighting apparatus according to some embodiments includes a terminal configured to receive an AC power signal, a full wave rectifier configured to generate a rectified AC input signal in response to the AC power signal, a reference voltage generator configured to generate a DC reference voltage in response to the rectified AC input signal, a plurality of light emitting devices coupled in series, a voltage controlled current source configured to supply a current to the plurality of light emitting diodes that is proportional to the rectified AC input signal, and a diode selection circuit including a comparator configured to receive the rectified AC input signal and the reference voltage and to generate a control signal in response to comparison of the rectified AC input signal with the reference voltage. The diode selection circuit includes a switch configured to receive the control signal and to shunt current away from at least one of the plurality of light emitting devices in response to the control signal.

The voltage controlled current source may include a first transistor, an emitter resistor coupled to an emitter of the first transistor, a diode coupled to a base of the first transistor, a first resistor coupled to a first terminal of the diode and a second resistor coupled to a second terminal of the diode, and a terminal configured to receive the rectified AC input signal coupled to the emitter resistor and to the first resistor. The diode may include a Zener diode.

A collector of the first transistor may be coupled to the series of light emitting devices.

In some embodiments, the circuit may further include a second transistor including a base coupled to a collector of the first transistor and a collector coupled to the emitter of the first transistor.

The circuit may further include an adjustable current sink coupled to the base of the first transistor. The adjustable current sink may include a third transistor having a collector coupled to the base of the first transistor and an emitter coupled to ground, and a diode coupled to a base of the third transistor. The base of the third transistor is configured to receive a pulse width modulation (PWM) control signal configured to control a conductivity of the third transistor.

The diode selection circuit may be configured to shunt current away from the at least one light emitting device in response to a level of the rectified AC input signal being below a threshold level.

The switch may include a field effect transistor, and the control signal may be applied to a gate of the field effect transistor.

The switch may further include a second transistor coupled in a cascode configuration with the field effect transistor so that conductivity of the second transistor may be controlled by the field effect transistor.

The second transistor may include a bipolar transistor including a base, a collector and an emitter, and a drain of the field effect transistor may be coupled to the emitter of the bipolar transistor, and the collector of the bipolar transistor may be coupled to an anode of the at least one light emitting device.

The switch may include a field effect transistor including a gate terminal and source/drain terminals, one of the source/drain terminals may be coupled to an anode of the at least one light emitting device and another of the source/drain terminals may be coupled to an cathode of the at least one light emitting device.

The lighting apparatus may further include a current supply circuit coupled to an anode of a first one of the plurality of light emitting devices, the current supply circuit including a bipolar transistor including a collector coupled to the anode of the first light emitting device, an emitter resistor coupled to an emitter of the bipolar transistor, and a bias circuit coupled to a base of the bipolar transistor.

Other apparatus and/or methods according to embodiments of the invention will be or become apparent to one with skill in the art upon review of the following drawings and detailed description. It is intended that all such additional apparatus and/or methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Figure 1A:
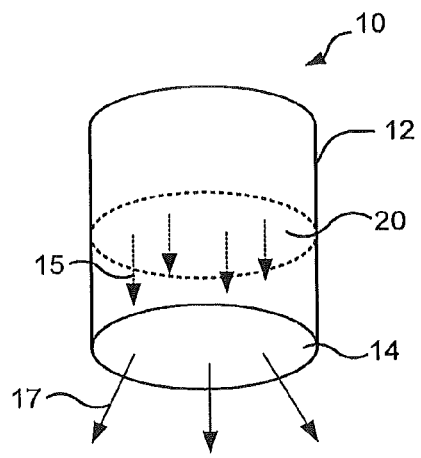
FIGS. 1A and 1B illustrate a solid state lighting apparatus in accordance with some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1B:
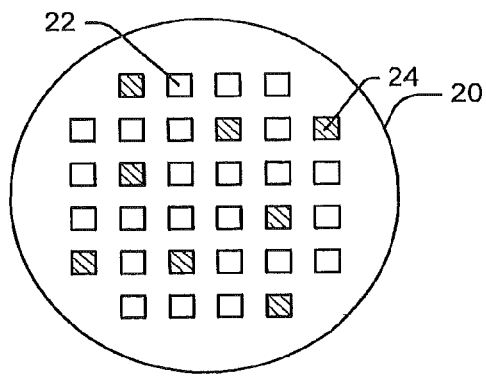

Referring to FIGS. 1A and 1B, a lighting apparatus 10 according to some embodiments is illustrated. The lighting apparatus 10 shown in FIGS. 1A and 1B is a "can" lighting fixture that may be suitable for use in general illumination applications as a down light or spot light. However, it will be appreciated that a lighting apparatus according to some embodiments may have a different form factor. For example, a lighting apparatus according to some embodiments can have the shape of a conventional light bulb, a pan or tray light, an automotive headlamp, or any other suitable form.

The lighting apparatus 10 generally includes a can shaped outer housing 12 in which a lighting panel 20 is arranged. In the embodiments illustrated in FIGS. 1A and 1B, the lighting panel 20 has a generally circular shape so as to fit within an interior of the cylindrical housing 12. Light is generated by solid state lighting devices (LEDs) 22, 24, which are mounted on the lighting panel 20, and which are arranged to emit light 15 towards a diffusing lens 14 mounted at the end of the housing 12. Diffused light 17 is emitted through the lens 14. In some embodiments, the lens 14 may not diffuse the emitted light 15, but may redirect and/or focus the emitted light 15 in a desired near-field or far-field pattern.

Still referring to FIGS. 1A and 1B, the solid-state lighting apparatus 10 may include a plurality of first LEDs 22 and a plurality of second LEDs 24. In some embodiments, the plurality of first LEDs 22 may include white emitting, or near white emitting, light emitting devices. The plurality of second LEDs 24 may include light emitting devices that emit light having a different dominant wavelength from the first LEDs 22, so that combined light emitted by the first LEDs 22 and the second LEDs 24 may have a desired color and/or spectral content.

For example, the combined light emitted by the plurality of first LEDs 22 and the plurality of second LEDs 24 may be warm white light that has a high color rendering Index.

The chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the hue of the light source. White light typically has a CCT of between about 2500K and 8000K. White light with a CCT of 2500K has a reddish color, white light with a CCT of 4000K has a yellowish color, and while light with a CCT of 8000K is bluish in color.

"Warm white" generally refers to white light that has a CCT between about 3000K and 3500K. In particular, warm white light may have wavelength components in the red region of the spectrum, and may appear yellowish to an observer. Warm white light typically provides a relatively high CRI, and accordingly can cause illuminated objects to have a more natural color. For illumination applications, it is therefore desirable to provide a warm white light.

In order to achieve warm white emission, conventional packaged LEDs include either a single component orange phosphor in combination with a blue LED or a mixture of yellow/green and orange/red phosphors in combination with a blue LED. However, using a single component orange phosphor can result in a low CRI as a result of the absence of greenish and reddish hues. On the other hand, red phosphors are typically much less efficient than yellow phosphors. Therefore, the addition of red phosphor in yellow phosphor can reduce the efficiency of the package, which can result in poor luminous efficacy. Luminous efficacy is a measure of the proportion of the energy supplied to a lamp that is converted into light energy. It is calculated by dividing the lamp's luminous flux, measured in lumens, by the power consumption, measured in watts.

Warm white light can also be generated by combining non-white light with red light as described in U.S. Pat. No. 7,213,940, entitled "LIGHTING DEVICE AND LIGHTING METHOD," which is assigned to the assignee of the present invention, and the disclosure of which is incorporated herein by reference. As described therein, a lighting device may include first and second groups of solid state light emitters, which emit light having dominant wavelength in ranges of from 430 nm to 480 nm and from 600 nm to 630 nm, respectively, and a first group of phosphors which emit light having dominant wavelength in the range of from 555 nm to 585 nm. A combination of light exiting the lighting device which was emitted by the first group of emitters, and light exiting the lighting device which was emitted by the first group of phosphors produces a sub-mixture of light having x, y color coordinates within a defined area on a 1931 CIE Chromaticity Diagram that is referred to herein as "blue-shifted yellow" or "BSY." Such non-white light may, when combined with light having a dominant wavelength from 600 nm to 630 nm, produce warm white light.

Blue and/or green LEDs used in a lighting apparatus according to some embodiments may be InGaN-based blue and/or green LED chips available from Cree, Inc., the assignee of the present invention. Red LEDs used in the lighting apparatus may be, for example, AlInGaP LED chips available from Epistar, Osram and others.

In some embodiments, the LEDs 22, 24 may have a square or rectangular periphery with an edge length of about 900 μm or greater (i.e. so-called "power chips." However, in other embodiments, the LED chips 22, 24 may have an edge length of 500 μm or less (i.e. so-called "small chips"). In particular, small LED chips may operate with better electrical conversion efficiency than power chips. For example, green LED chips with a maximum edge dimension less than 500 microns and as small as 260 microns, commonly have a higher electrical conversion efficiency than 900 micron chips, and are known to typically produce 55 lumens of luminous flux per Watt of dissipated electrical power and as much as 90 lumens of luminous flux per Watt of dissipated electrical power.

The LEDs 22 in the lighting apparatus 10 may include white/BSY emitting LEDs, while the LEDs 24 in the lighting apparatus may emit red light. The LEDs 22, 24 in the lighting apparatus 10 may be electrically interconnected in respective strings, as illustrated in the schematic circuit diagram in FIG. 1G. As shown therein, the LEDs 22, 24 may be interconnected such that the white/BSY LEDs 22 are connected in series to form a first string 34A. Likewise, the red LEDs 24 may be arranged in series to form a second string 34B. Each string 32, 34 may be connected to a respective anode terminal 23A, 25A and a cathode terminal 23B, 25B.

Figure 1C:
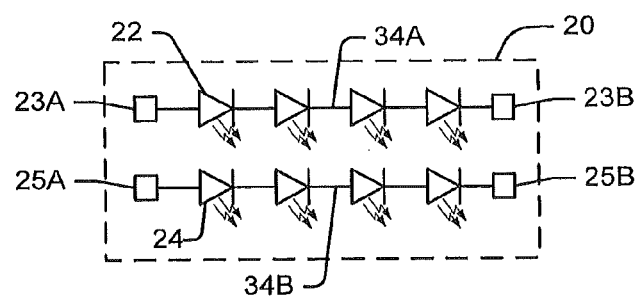
FIG. 1C is a schematic circuit diagram illustrating series interconnection of light emitting devices (LEDs) in a solid state lighting apparatus.

Although two strings 34A, 34B are illustrated in FIG. 1C, it will be appreciated that the lighting apparatus 10 may include more or fewer strings. Furthermore, there may be multiple strings of white/BSY LEDs 22, and multiple strings of red or other colored LEDs 24.

Figure 2:
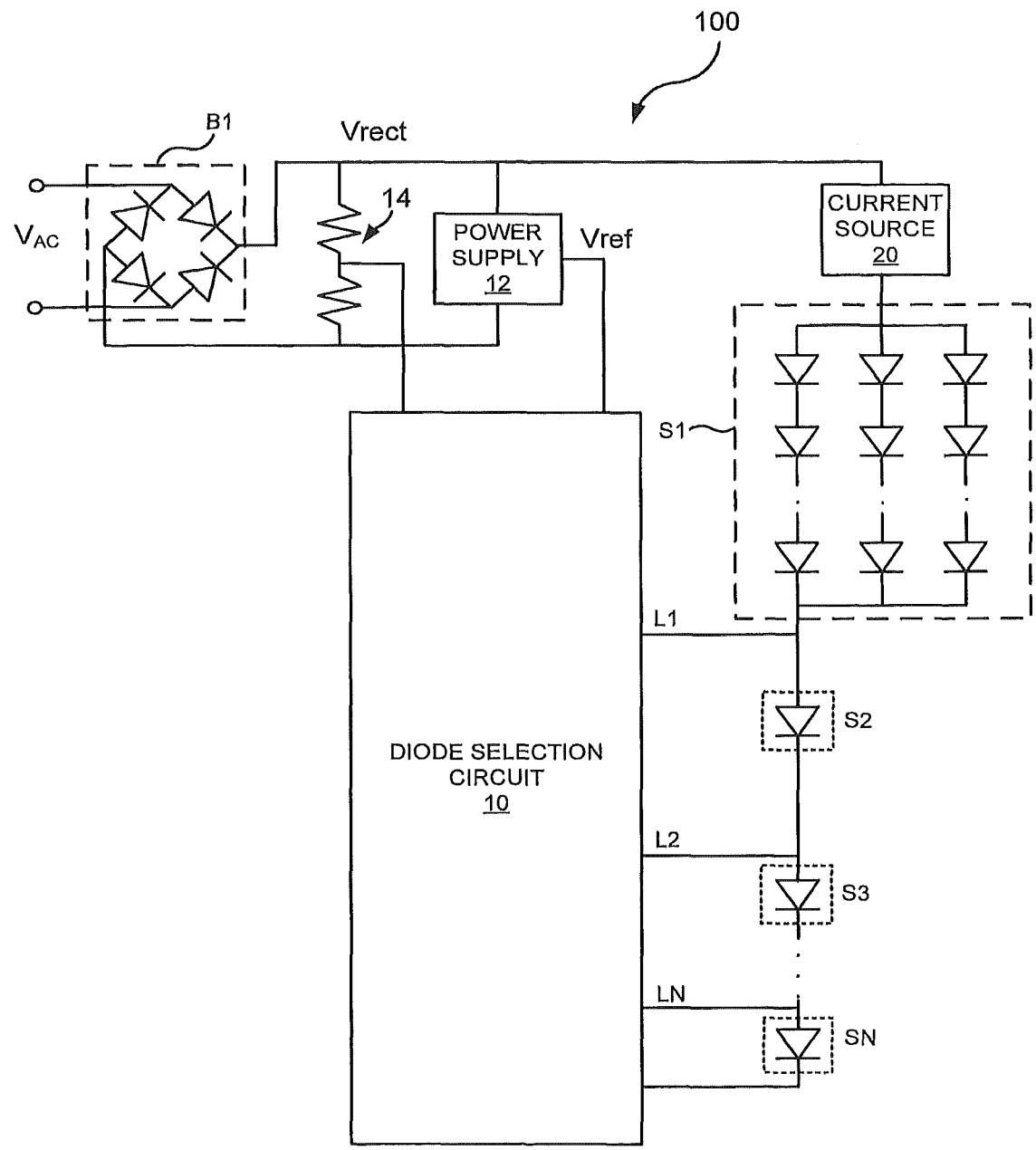
FIG. 2 is a schematic circuit diagram illustrating a drive circuit for a solid state lighting apparatus in accordance with various embodiments of the invention.

Referring now to FIG. 2, a drive circuit 100 for driving a plurality of solid state light emitting devices in a solid state lighting apparatus is illustrated. In particular, the drive circuit 100 is configured to drive a plurality of LEDs, or sets of LEDs, that are connected in series. As illustrated in FIG. 2, the sets of LEDs may include and sets S1, S2, . . . SN. Each set of LEDs S1 to SN may include one or more LEDs connected in series and/or parallel. For example, as illustrated in set S1, the LEDs in a set may be connected in respective series strings that are themselves connected in parallel. The total number of LEDs in series may be selected so that the circuit has a suitably high efficiency when the input voltage to the string is at the maximum line voltage. Efficiency may also be increased by keeping the voltage across the selected LEDs close to an applied AC voltage, as discussed below.

An alternating current signal $V_{AC}$ is applied to a full wave rectifier bridge B1. The output of the full wave rectifier bridge B1 is a rectified AC signal Vrect. The rectified AC signal Vrect may be applied to a current source, such as a series resistor or a voltage controlled current source, which supplies current to the first set S1 of LEDs. Subsequent sets of solid state lighting devices S2 to SN are connected in series with the first set S1. Control lines L2, L3, . . . LN are coupled to anodes of respective sets of LEDs S2 to SN.

The drive circuit 100 includes a diode selection circuit 10, a power supply 12, and a voltage divider 14. The rectified signal Vrect is divided by the voltage divider 14 and supplied as a control signal to the diode selection circuit 10. The rectified signal Vrect is also supplied to a power supply 12, which responsively generates a substantially steady reference voltage Vref, which is also supplied to the diode selection circuit 10. In some embodiments, the power supply 12 may generate more than one reference voltage, e.g., a family of reference voltages of various levels.

The diode selection circuit 10 is configured to dynamically adjust the number of LEDs that are being driven by the rectified AC voltage Vrect in response to a level of the rectified AC signal Vrect, so that a voltage drop of diodes that are being driven at any given point in time is less than the level of the rectified AC signal Vrect. In this manner, the AC waveform may be more fully utilized, potentially increasing light output from the circuit, improving the power factor of the circuit, and or reducing visible flicker of light generated by the circuit. In general, the diode selection circuit is designed to keep the instantaneous LED string voltage close to but always slightly less than Vrect, which may reduce or minimize the voltage dropped across the current source 20, thereby increasing or maximizing efficiency, and more fully utilizing the AC waveform to generate more light. In some embodiments, compared to apparatus including non-switched LED strings, the THD may improve from 85% to 25%.

In operation, when the level of the rectified AC voltage Vrect is low, only the first group LEDs S1 may be driven by the rectified AC signal Vrect, while the other sets of LEDs S2 to SN may be switched out of the circuit and/or bypassed, so that they are not being driven by the rectified signal Vrect. As the rectified AC signal Vrect increases, successive sets of LEDs S2 to SN may be switched into the circuit so that they are being driven by the rectified AC signal Vrect until all of the sets of LEDs S1 to SN have been switched into the circuit and are being driven by the rectified AC signal Vrect.

In a switching arrangement that utilizes a resistor (Rseries) as the current source, the voltage across Rseries starts off small, and increases until the next switching threshold is reached, at which point it returns to zero and the process begins again. This is during the first half-cycle of Vrect(t), where Vrect(t) is rising. During the second half-cycle of Vrect(t), Vrect(t) is falling and the LED current is the mirror image of the first half-cycle. It is therefore sufficient to consider only the first half-cycle. Assuming a Binary Weighted Switching approach in which LEDs are controllably switched in groups of 1, 2, 4, 8, etc., . . . , the LED current is given by:

$$Vrect(t) = Vpeak*|\sin(2*\square*Fac*t)|-2*Vf$$

$$Vr\_series = Vrect(t)-\text{floor}([Vrect(t)-Vdrop]/Vled)*Vled$$

$$ILED(t) = [Vrect(t)-\text{floor}([Vrect(t)-Vdrop]/Vled)*Vled]/Rseries$$

Figure 3A:
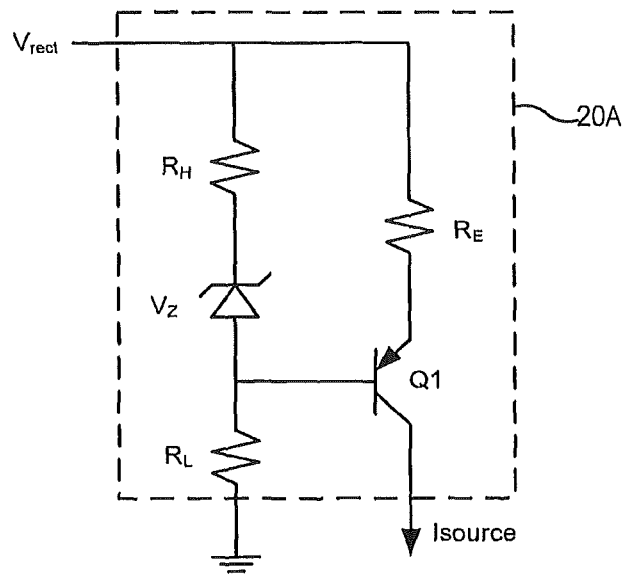
FIGS. 3A, 3B and 3C are schematic circuit diagrams illustrating voltage controlled current sources for a solid state lighting apparatus in accordance with various embodiments of the invention.

Rather than using a series resistor, some embodiments drive the bank of dynamically switched LEDs with a Voltage Controlled Current Source (or sink)—a VCCS, as illustrated in FIG. 3A.

According to some embodiments, current to the LED string is provided by a voltage controlled current source (VCCS) 20A. The current source 20A includes a PNP transistor Q1 having an emitter resistor $R_E$ coupled to the emitter thereof and a bias circuit including resistors $R_H$ and $R_L$ and a zener diode $V_Z$ coupled to the base thereof. Output current $I_{OUT}$ is sourced by the current source 20 according to the following equations:

$$I_{SOURCE} = \frac{V_Z}{R_E} + Vrect\left(\frac{R_H}{R_H+R_L}\right)\left(\frac{1}{R_E}\right)$$

$$I_{SOURCE} = I_0 + kVrect$$

Accordingly, the output current is proportional to the rectified input voltage Vrect. This circuit may therefore further regulate the output current to help reduce spikes as sets of LEDs are switched into/out of the circuit. It will be appreciated that the zener diode could be replaced with another type of diode that has a voltage drop that is substantially matched to the base-emitter junction of the transistor Q1.

Figure 3B:
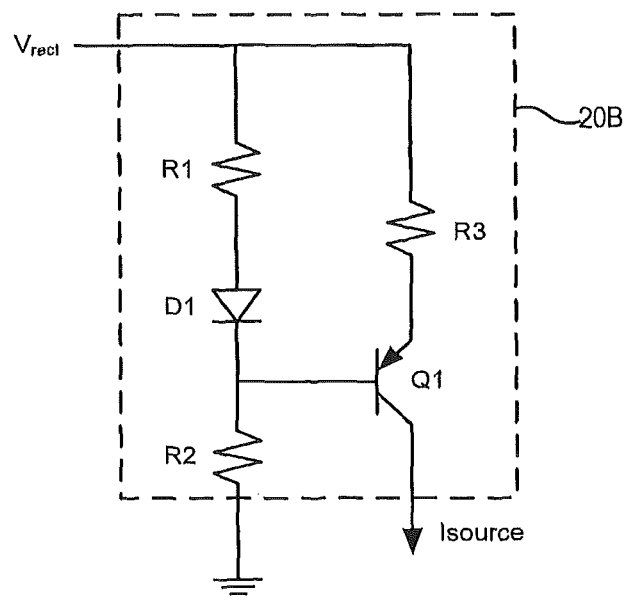

A more general illustration of a VCCS 20B is shown in FIG. 3B, and will be discussed below.

The VCCS 20B illustrated in FIG. 3B includes resistors R1, R2 and R3, diode D1 and PNP transistor Q1. Assuming D1 and Q1 are matched and thermally coupled, Vf(D1)=Vbe (Q1). Assuming transistor Q1 has sufficient gain, then the voltage across resistor R3 is the same as the voltage across resistor R1.

Figure 3C:
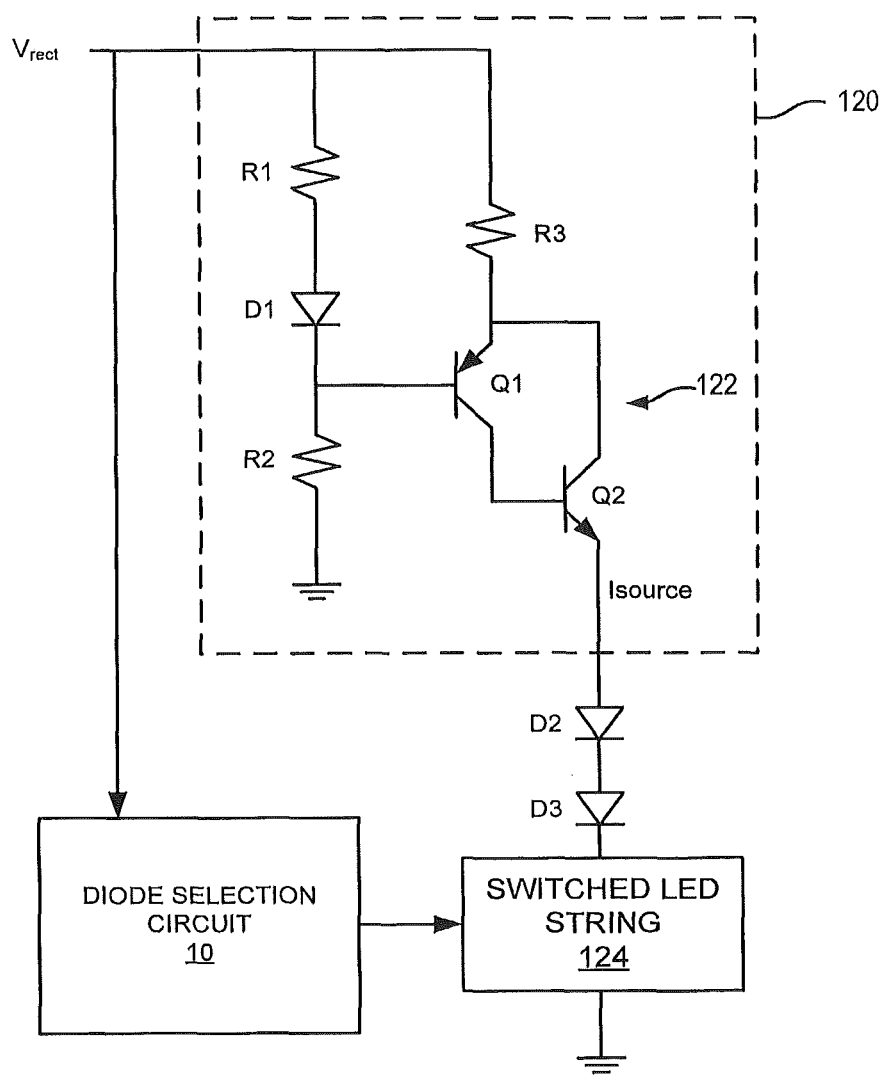

Referring to FIG. 3C, a Sziklai pair 122 may be used in a VCCS current source 120 according to some embodiments. The Sziklai pair 122 includes a PNP transistor Q1 and an NPN transistor Q2. The collector of the PNP transistor Q1 is coupled to the base of the NPN transistor Q2, and the emitter of the PNP transistor Q1 is coupled to the collector of the NPN transistor Q2, as shown in FIG. 3C. The emitter of the NPN transistor Q2 is coupled to the switched LED string 124, which is controlled by the diode selection circuit 10. A Sziklai pair may have a low saturation voltage and temperature coefficient, but very high gain (and the high power transistor Q2 is NPN). Darlington transistors may be used, but the saturation voltage is larger and there are two base-emitter junctions requiring thermal compensation. MOSFET current sources may also be used in some embodiments.

If we then assume that Vrect(t)>>Vf(D1), the voltage across R1 is given by:

$$Vr1 = Vrect(t) - Vrect(t)*R2/(R1+R2)$$

which re-arranges to give:

$$Vr1 = Vrect(t)*R1/(R1+R2)$$

Furthermore:

$$Vr3 = Isource*R3 = Vr1$$

Thus:

$$Isource*R3 = Vrect(t)*R1/(R1+R2)$$

$$Isource = [Vrect(t)/R3]*[R1/(R1+R2)]$$

$$Isource = [Vrect(t)/R3]*[1/(R1+R2)/R1]$$

$$Isource = [Vrect(t)/R3]*[1/(1+R2/R1)]$$

$$Isource = Vrect(t)/[R3*(1+R2/R1)]$$

which can be written as:

$$Isource(t) = Vrect(t)/Req$$

$$Req = R3*(1+R2/R1)$$

Although it is called a constant current source, it is clear that the current Isource is directly proportional to Vrect(t). Hence the term Voltage Controlled Current Source (VCCS) is more properly used to describe the current source 20B.

Typical circuit designs attempt to remove the dependence on Vrect(t). However, in some embodiments, it may be more appropriate not to have a constant current. If D1 is used to compensate for the static and dynamic base-emitter voltage Vbe of Q1 (−2.2 mV/K), a Voltage Controlled Current Source (VCCS) is provided. The VCCS has a minimum dropout voltage of:

$$Vdropout = Vcesat(Q1) + Isource*R3$$

Where Vcesat(Q1) increases with increasing Isource. It is sufficient to use Isource_max when calculating Vcesat(Q1) and the voltage drop across R3. If a string of dynamically switched LEDs is driven with a VCCS, and the circuit is designed so that Vdrop>Vdropout (in other words the dynamic switching controller ensures the VCCS always has enough headroom to regulate Isource), then the LED current is always proportional to Vrect(t).

As noted above:

$$Vrect(t) = Vpeak*|\sin(2*\square*Fac*t)|=2*Vf$$

Assuming $V_{peak}*|\sin(2*\pi*F_{ac}*t)| \gg 2*V_f$, then:

$$V_{rect}(t) = V_{peak}*|\sin(2*\pi*F_{ac}*t)|$$

and $$I_{source}(t) = V_{rect}(t)/R_{eq}$$

Thus:

$$I_{source}(t) = V_{peak}*|\sin(2*\pi*F_{ac}*t)|/R_{eq}$$

$$I_{source}(t) = [V_{peak}/R_{eq}]*|\sin(2*\pi*F_{ac}*t)|$$

$$I_{source}(t) = I_{peak}*|\sin(2*\pi*F_{ac}*t)|$$

where $I_{peak}=V_{peak}/R_{eq}$ and $R_{eq}=R3*(1+R2/R1)$

The input current is therefore substantially sinusoidal, although the foregoing analysis has ignored the bridge rectifier, D1 and Vdrop voltages, which cause a small amount of dead time and prevent Isource(t) from being perfectly sinusoidal.

Figure 3D:
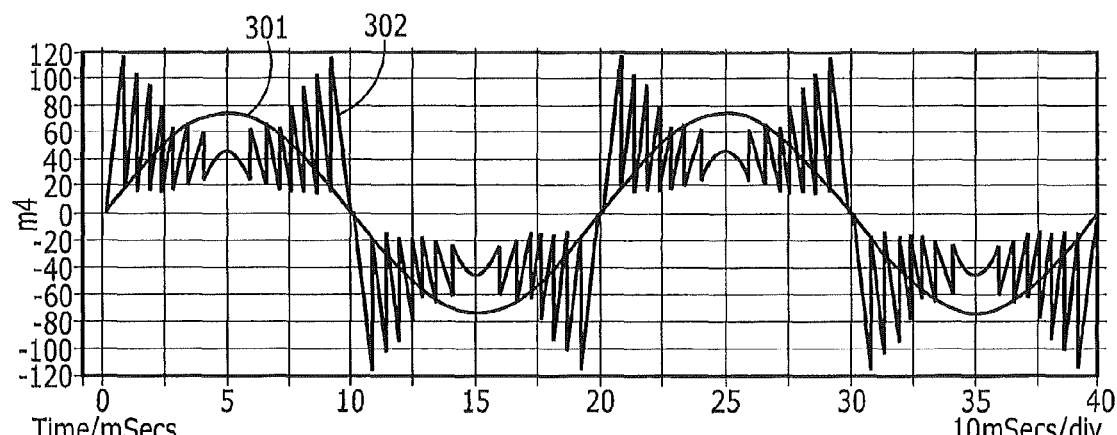
FIG. 3D is a graph of simulated output current of voltage controlled current sources for a solid state lighting apparatus in accordance with various embodiments of the invention.

A simulation comparing a VCCS with a resistor current source is shown in FIG. 3D. Curve 301 is a graph of Isource(t) for a dynamically switched LED driver circuit including a VCCS current source with an equivalent resistance Req=2.22 kΩ, while curve 302 is a graph of Isource(t) for a dynamically switched LED driver circuit including a series resistor current source having a resistance R series=270Ω.

Both circuits use the same Dynamically Switched LED string which is non-linear (but not binary), and designed for minimum loss with 7 switches. Two LEDs are always in series, to provide for a free low voltage supply (and to allow for flicker-free dimming).

For a resistor current source using Rseries=270Ω, the total harmonic distortion is 77.4%. For the VCCS with Req=2.22 kΩ, the input current is very close to a pure sinusoid, and has 2.4% THD. The power factor is greater than 0.99.

Figure 4A:
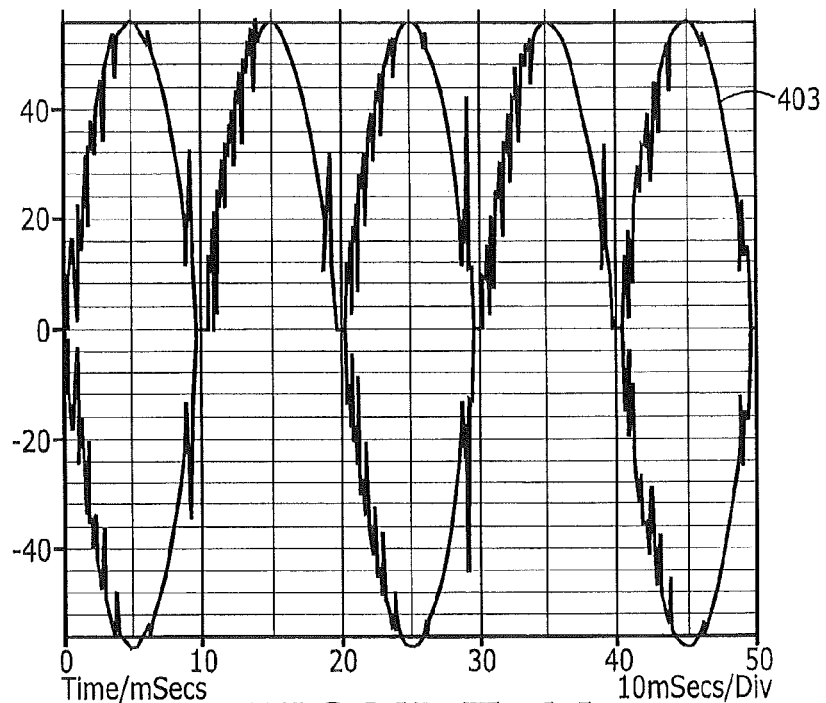
FIG. 4A is a graph illustrating output current.

In embodiments in which the LED current is set using a Voltage Controlled Current Source, such as the VCCS circuits 20A, 20B illustrated in FIG. 3A and/or FIG. 3B, to set the LED current proportional to Vrect, the output current waveform may exhibit some spikes at the switching instant, as illustrated in FIG. 4A, which is a graph 403 of simulated output current for a circuit according to some embodiments. Current spikes are visible in the output current signal 403 at the switching instants.

When a set of k LEDs is switched in (or out) of the string, the LED string voltage rises (or falls) by k*Vled. This occurs fairly quickly—shorting a set is as fast as the shorting switch itself. The time taken removing the short circuit from a set is governed by the current source charging the stray capacitance of the set, which is fairly small.

Once a shorting switch is turned OFF (and assuming there are not minority carrier storage-time issues), the current source sets the slew rate as it charges up the stray capacitance. However, the current source is haversinusoidal, so over one quarter AC line period the current ranges from near zero to 1.4*Irms.

The uppermost LED anode connects to the collector of the PNP current source transistor Q4, so changes in the LED string voltage change the PNP collector voltage an equal amount.

Figure 4B:
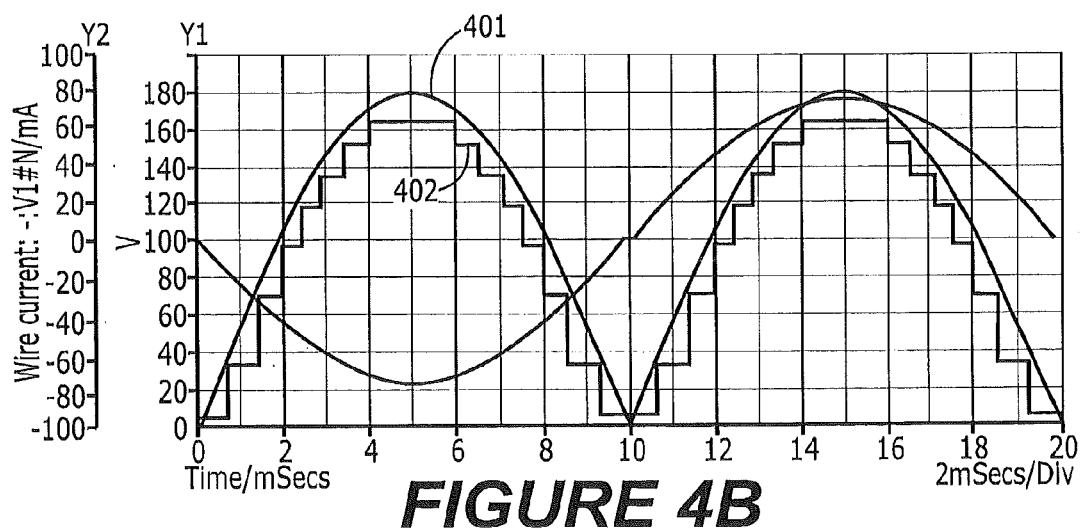
FIG. 4B is a graph illustrating input and output voltage waveforms, for solid state lighting systems in accordance with various embodiments of the invention.

This feeds current $I=C_m*dV/dt$ from the collector to the base through the BJT Miller capacitance Cm, and causes the current source to misbehave, which is what creates the spikes shown in FIG. 4B.

It may be possible to reduce or avoid these spikes by designing the VCCS so they are reduced, or by controlling the slew rate of the switches.

Simulated example voltage and current waveforms for a drive circuit 100 according to some embodiments are illustrated in FIG. 4B. Referring to FIG. 4B, curve 401 is a rectified AC sine wave Vrect, while curve 402 is a graph of the voltage across the LEDs that are switched into the circuit at any given instant, that is, the sum of the voltage drops of all of the LEDs that are energized at a particular instant. As illustrated in FIG. 4A, as the rectified AC signal Vrect increases, successive groups of LEDs are switched into the circuit, and the output voltage increases in steps as successive sets of LEDs are energized.

According to some embodiments, the numbers of LEDs that are switched on at any given step and the threshold levels of Vrect that result in such sets being switched in our chosen so that the level of Vrect remains greater than the sum of the forward voltages of the energized LEDs at each successive step. Accordingly, as the level of Vrect rises, all LEDs that are switched into the circuit may remain energized when a successive set of LEDs is switched into the circuit.

As the level of Vrect falls, successive sets of LEDs may be switched out of the circuit to ensure that the level of the voltage across the energized diodes remains below Vrect at substantially each time instant.

Referring again to FIG. 2, once Vrect exceeds the voltage required to turn on the LEDs in set S1, the LEDs are forward biased and current begins to flow through the LEDs. The voltage dropped across these resistors is equal to Vrect-Vled (where Vled is the voltage across the LEDs in S1), so the current ramps up with the same slope as Vrect. When Vrect is sufficiently above Vled (as a function of losses in the current source), the diode selection circuit 100 switches the next set S2 of LEDs in series, so the total LED string voltage increases by Vnew_led_string, which may be chosen such that:

$$V_{rect}(t=T_{switch}) > V_{led} + V_{new\_led\_string}.$$

This ensures that when the new LED string is switched in series, the current through the current source is still slightly positive.

We can define $dV=V_{rect}(T_{switch})-(V_{led}+V_{new\_led\_string})$. If dV>0, current through the LEDs drops down to a positive, non-zero value when the new set is switched into the series. If dV=0, the current drops down to zero when the new set is switched into the series.

If dV<0, the current tries to drop below zero, but the LEDs are unipolar so current cannot flow, and current continues to not flow until Vrect rises enough to make Vled>0.

Thus, when dV<=0, current in the LEDs is equal to zero, so dV should be made greater than zero keep current flowing through the diodes, regardless of current control methodology. If not, the current drops to zero at the switching edge, and stays there until Vrect is greater than the voltage drop of all LEDs switched into the series.

Furthermore, as dV becomes more negative the zero current period gets longer. So, the switching edge may give rise to notches (down/up to 0 A) in the input current waveform, if dV is not chosen well.

With a resistor as the input current source, all that is needed is dV>=0. With a current source, however, there is a finite dropout voltage Vcsdo, that may, for example, be about 1V, below which the current source is OFF. The constraint on dV when using a Voltage Controlled Current Source (VCCS) is therefore dV>=Vcsdo.

Figure 5:
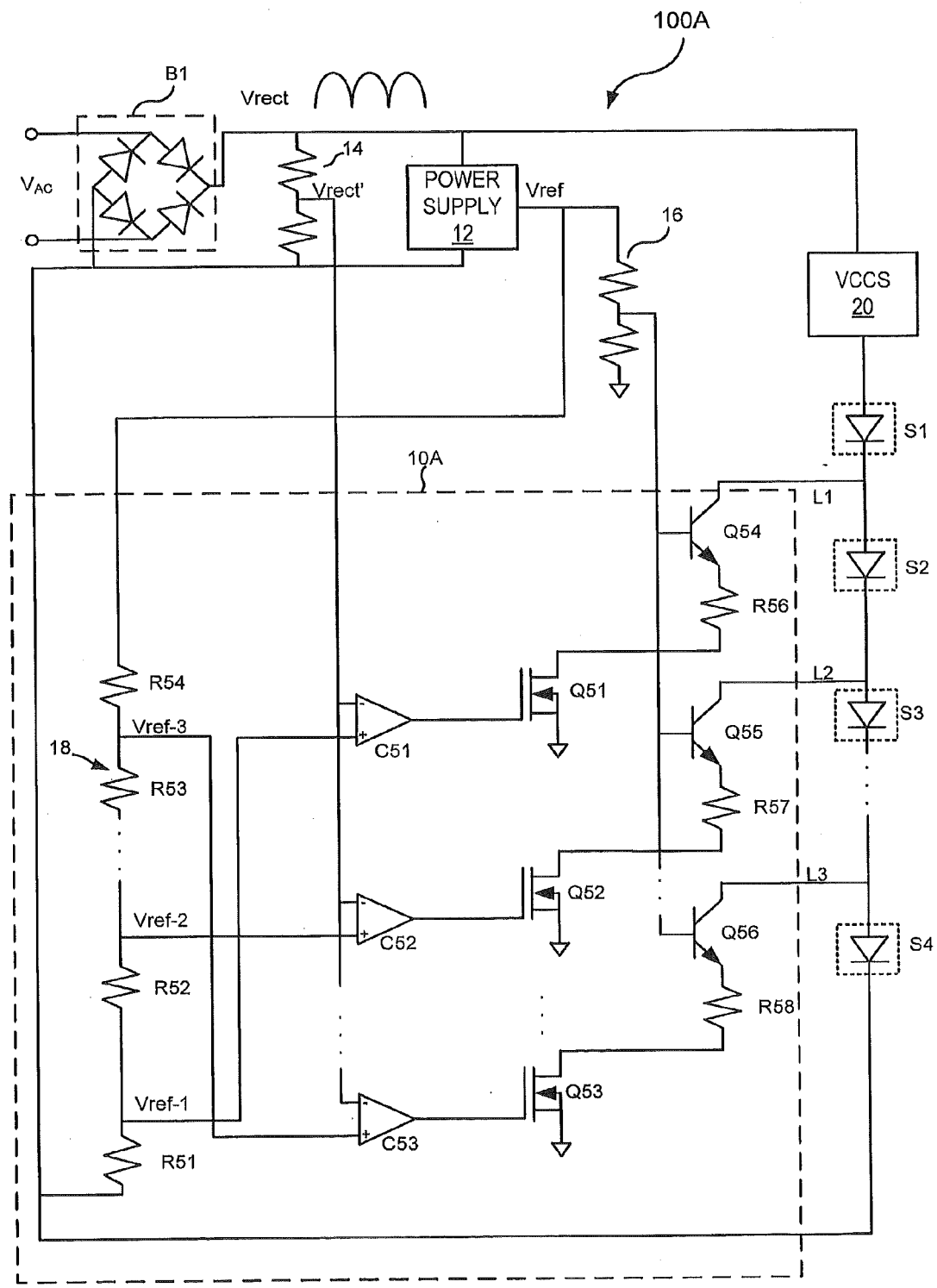
FIG. 5 is a schematic circuit diagram illustrating a diode selection circuit according to some embodiments of the invention.

A drive circuit 100A including a diode selection circuit 10A is illustrated in more detail in FIG. 5. As illustrated therein, the diode selection circuit 10A includes a voltage divider ladder 18 including resistors R51 to R54 that generate a plurality of reference voltages Vref-1, Vref-2 and Vref-3 from the reference voltage Vref.

The diode selection circuit 10A further includes a plurality of comparators C51 to C53 and switching transistors Q51 to Q53 having gates coupled to respective outputs of the comparators C51 to C53. In the embodiments illustrated in FIG. 5, sources of the switching transistors Q51 to Q53 are coupled to ground, and drains of the switching transistors Q51 to Q53 are coupled to emitters of respective shunting bipolar transistors Q54 to Q56 through respective resistors R56, R57 and R58. Collectors of the bipolar shunting transistors Q54 to Q56 are coupled to respective control lines L1, L2, and L3, which are in turn coupled to anodes of respective ones of the sets S2, S3 and S4 of LEDs.

Reference voltages Vrect-1 to Vrect-3 generated by the voltage divider ladder 18 are applied to the non-inverting inputs of the comparators C51 to C53. In particular, the lowest reference voltage Vref-1 is applied to the non-inverting input of the comparator C51, the reference voltage Vref-2 is applied to non-inverting input of the comparator C52, and the highest reference voltage Vref-3 is applied to the non-inverting input of the comparator C53.

An optional voltage divider 16 supplies a bias voltage to the bases of the respective bipolar shunting transistors Q54 to Q56.

One or more of the sets S2 to S4 of series connected LEDs may be switched out of the drive circuit based on the level of the rectified AC input signal Vrect. In particular, based on a comparison of the level of Vrect' with one of the reference voltages Vref-2 to Vref-3, the drive current of the LEDs may be shunted through one of the bipolar shunting transistors Q54 to Q56 through a respective emitter resistor R56 to R58 to ground, bypassing one or more sets of LEDs S2 to S4. Current through the remaining LEDs may be controlled by the bias level of the bipolar shunting transistor Q54 to Q56 through which the LED drive current is shunted.

Figure 6:
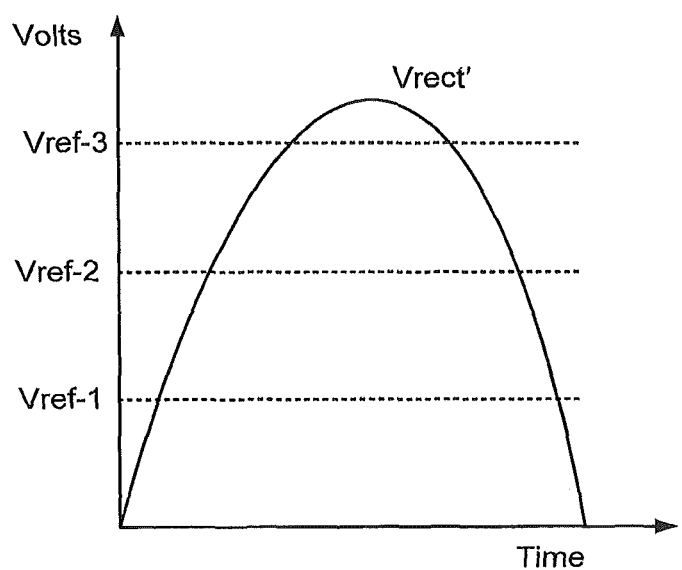
FIG. 6 is a graph illustrating a rectified voltage signal according to some embodiments.

Operation of the drive circuit 100A and the diode selection circuit 10A illustrated in FIG. 5 will now be described further reference to FIG. 6, which is a graph of one cycle of the scaled AC rectified signal Vrect'. Referring to FIGS. 5 and 6, when the value of Vrect' is lower than the lowest reference voltage Vref-1, the non-inverting inputs to the comparators C51 to C53 are all less than the corresponding reference voltages Vref-2 to Vref-3 that are input into the non-inverting inputs to the comparators C51 to C53. Accordingly, each of the comparators C51 to C53 generates a high output voltage, which switches each of the respective switching transistors Q51 to Q53 to an ON state. In particular, the transistor Q51 is switched on, which also is emitter switches the bipolar shunting transistor Q54 to a conductive state. When the bipolar shunting transistor Q54 is conductive, the anode of the second set S2 of LEDs is coupled to ground though the switching transistor Q51, thereby bypassing the subsequent sets S2 to S4 of LEDs.

When the level of Vrect exceeds the forward voltage drop of the LEDs in the first set S1, the LEDs in the first set S1 will turn on and begin to generate light.

As the level of Vrect' continues to increase, it reaches the lowest reference voltage Vrect-1. At that point, the output of the comparator C51 switches to low, thereby turning off the switching transistor Q51 and the bipolar shunting transistor Q54. However, because the voltage Vrect' is still less than the second reference voltage Vref-2, comparators C52 and C53 continue to output a high level, so that the third and fourth sets S3 and S4 of LEDs continue to be switched out of the circuit and not energized. Thus, when the level of Vrect' is between Vref-1 and Vref-2, only the first and second sets S1 and S2 of LEDs may be energized.

As Vrect' continues to increase, it reaches the value of Vref-2, at which point the second comparator C52 also switches to a low output, turning off switching transistor Q52 and bipolar shunting transistor Q55. This switches the third set S3 of LEDs into the drive circuit, while continuing to bypass the fourth set S4 of LEDs.

Finally, as Vrect' reaches the value of the third reference signal Vref-3, the third comparator C53 also switches to low output, turning off transistors Q53 and Q56 and switching the fourth set S4 of LEDs into the drive circuit.

The bipolar transistors Q54 to Q56 provide a means both for controlling current flow through the LEDs that are currently switched into the drive circuit, as well as providing an inexpensive and reliable transistor for sustaining the voltage of LEDs that are in the ON state. For example, if the transistor Q54 to Q56 were not included and the MOS transistors Q51 to Q53 were directly coupled to the output lines L1 to L3, when the Vrect' greater than Vrect-3 and all three of the switching transistors Q51 to Q53 are switched off, the transistor Q51 would have to be capable of sustaining entire voltage drop over sets S2, S3 and S4 of LEDs. This may require a larger and more expensive MOS transistor. Furthermore, it might be difficult to regulate current at the output of the energized LEDs.

The bipolar shunting transistors Q54 to Q56 may be biased in a linear mode and emitter-switched by the switching transistors Q51 to Q53.

A circuit according to some embodiments can drive LEDs with a relatively high power factor. In general, "power factor" refers to how closely aligned the output current and voltage waveforms are over each cycle. Instead of switching current on and off only near peaks of the rectified waveform when an entire string is energized, current is drawn in steps as the rectified waveform changes. Thus, the output current may follow the input voltage waveform more closely in circuits according to some embodiments.

Figure 7:
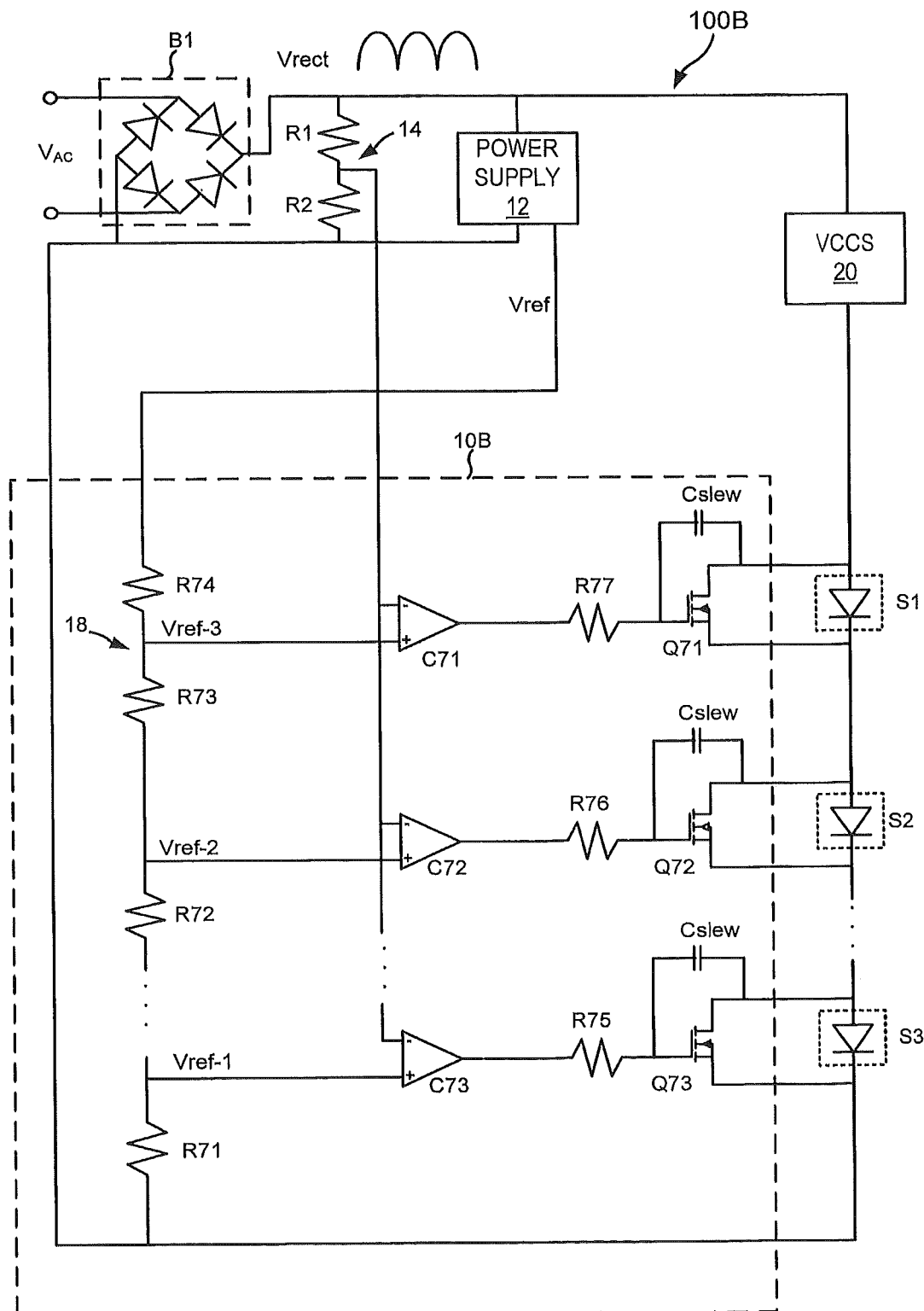
FIGS. 7, 8 and 9 are schematic circuit diagrams illustrating diode selection circuits according to further embodiments of the invention.

A drive circuit 100B including a diode selection circuit 10B according to further embodiments is illustrated in FIG. 7. The drive circuit 100B includes similar elements as the drive circuit 100A illustrated in FIG. 5, including a bridge rectifier B1, a power supply 12, and a voltage divider 14. Operation of these elements is similar to the operation of like elements in drive circuit 100A, and need not be described again in detail.

The diode selection circuit 10B includes a voltage divider ladder 18 that is configured to generate a range of reference voltages Vref-1 to Vref-3, which are supplied to the non-inverting inputs of respective comparators C71 to C73, as illustrated in FIG. 7. A scaled version Vrect' of the rectified input voltage Vrect is supplied to the inverting inputs of the comparators C71 to C73. The outputs of the comparators C71 to C73 are coupled to respective gates of shunting MOS transistors Q71 to Q73 through bias resistors R75, R76 and R77. Drain and source terminals of the shunting transistors Q71 to Q73 are coupled to anode and cathode contacts, respectively, of respecting sets of LEDs S1, S2 and S3. Optional slew-rate control capacitors Cslew may be coupled between the gates and drains of the transistors Q71 to Q73.

Referring to FIGS. 6 and 7, when Vrect' is less than Vref-1, all three comparators C71 to C73 output a high voltage level, which turns on the respective transistors Q71 to Q73, thereby bypassing sets S1, S2 and S3 of LEDs. When Vrect' reaches Vref-1, comparator C73 outputs a low level which turns transistor Q73 off, thereby energizing set S3, while sets S1 and S2 remain bypassed.

Similarly, when Vrect' reaches Vref-2, comparator C72 outputs a low level which turns transistor Q72 off, thereby energizing set S2, while set S1 remains bypassed.

Finally, when Vrect' reaches Vref-3, comparator C71 outputs a low level, which turns transistor Q71 off, thereby energizing set S1, at which point all three sets S1 to S3 are energized and emit light.

The number of LEDs in a given set S1 to S3 may be varied to produce a desired turn-on characteristic. Furthermore, the values of resistors in the voltage divider ladder 18 may be selected to provide an appropriate voltage threshold for each set S1 to S3 depending on the number of LEDs in such sets.

Although circuits including three or four sets S1 to S4 are illustrated in FIGS. 3 through 7, a circuit according to some embodiments may have more or fewer sets of LEDs. Furthermore, each set may include one or more LEDs connected in series, parallel, or series/parallel as noted above.

In some embodiments, the first set S1 may include only a single LED in each branch to reduce the turn on voltage for the first string to a minimum level.

In some embodiments, the number of series LEDs in sets that are switched on at low voltages may be higher than the number of LEDs in sets that are switched on at higher voltages to match the sinusoidal shape of the rectified AC waveform, which may further reduce resistive losses in the apparatus. For example, referring to FIG. 5, set S2, which is switched into the circuit when Vrect' reaches Vref-1, may include more LEDs in series than set S3, which is not switched into the circuit until Vrect' reaches Vref-2.

Referring again to FIG. 7, it will be appreciated that the peak voltage across each switch is always limited to the total forward voltage of the LED segment it shorts out. All switches can thus be low voltage, and it is quite possible to use the same FET for all switches. The low-voltage FETs make this suitable for integration.

All N switches are ON and in series when Vrect(t) and Isource(t) are both low, so although the total on resistance is the sum of the N individual switch RDS_ON, conduction losses are low.

Furthermore because the switch voltage is relatively low, fairly low-voltage MOSFETs with much lower RDS_ON can be used. The switches that spend the most amount of time ON, must be low RDS_ON.

One potential disadvantage of the circuit of FIG. 7 is that, once the switches are all OFF, each gate drive sits at a higher voltage than the one below. However when all switches are ON, all of the FET Sources are at roughly the same potential. If the uppermost FET Q1 is turned off first, all of the lower FETs remain at the same potential. The switching sequence is thus:

all FETs ON
uppermost FET OFF
second highest FET OFF
•
••
second-to-lowest FET OFF
• lowest FET OFF (all FETs now OFF)
• lowest FET ON
• second-to-lowest FET ON
•
••
second highest FET ON
• uppermost FET ON (all FETs now ON)

This can be exploited to implement a fully integrable design.

Figure 8:
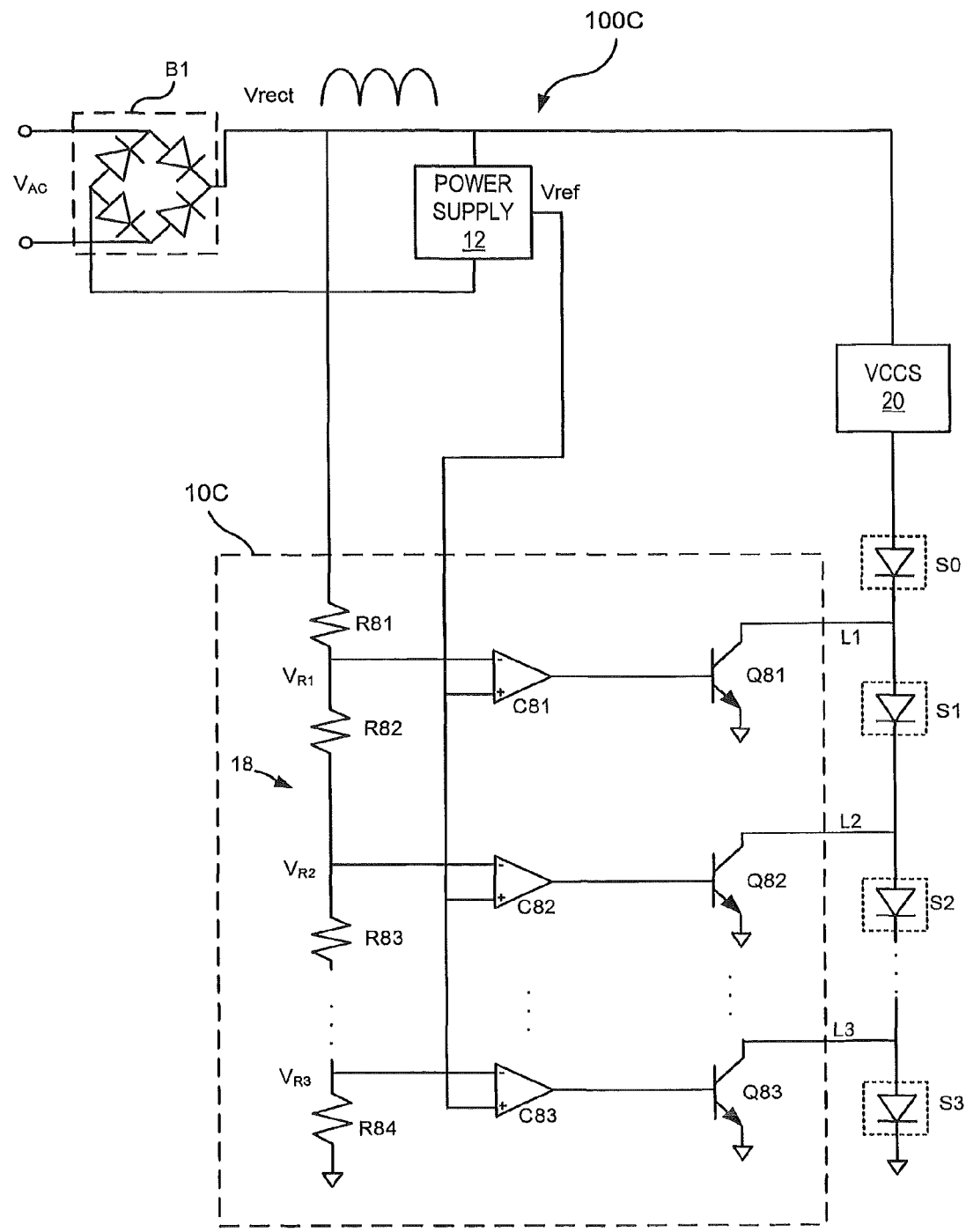

Referring to FIG. 8, a drive circuit 100C according to further embodiments is illustrated. The drive circuit 100C includes similar elements as the drive circuit 100A illustrated in FIG. 5, including a bridge rectifier B1 and a power supply 12. Operation of these elements is similar to the operation of like elements in drive circuit 100A, and need not be described again in detail.

The drive circuit 100C further includes a diode selection circuit 100 and a voltage controlled current source 20. The current source 20 is configured to supply current to the sets S0 to S3 of light emitting devices at a current level that is proportional to the rectified input voltage Vrect, which may improve the power factor of the circuit.

In particular, the diode selection circuit 100 includes a voltage divider 18 that includes a plurality of resistors R81 to R84 in series. The voltage divider 18 divides the rectified input voltage Vrect into a plurality of voltages $V_{R1}, V_{R2}, V_{R3}$, which are applied to the inverting inputs of respective comparators C81 to C83. Outputs of the comparators C81 to C83 are applied to bases of respective bipolar transistors Q81 to Q83, which act as switches that controllably switch anodes of respective sets S1 to S3 of light emitting devices to ground. A reference voltage Vref is applied to the noninverting inputs of the comparators C81 to C83.

In operation, when the rectified input voltage Vrect is low, all three voltages $V_{R1}, V_{R2}, V_{R3}$, which are applied to the inverting inputs of respective comparators C81 to C83, are less than the reference voltage Vref, and consequently all three comparators C81 to C83 output a high voltage, causing the transistors Q81 to Q83 to be in an ON state, bypassing sets S1 to S3 of light emitting devices.

As the rectified input voltage Vrect increases, the highest comparator input voltage $V_{R1}$ reaches the level of the reference voltage Vref, and the output of the first comparator C81 switches to a low voltage, placing the transistor Q81 in the OFF state, and switching set S1 into the drive circuit to be energized by the rectified input voltage Vrect.

As the rectified input voltage Vrect increases further, the next highest comparator input voltage $V_{R2}$ reaches the level of the reference voltage Vref, and the output of the second comparator C82 switches to a low voltage, placing the transistor Q82 in the OFF state, and switching set S2 into the drive circuit to be energized by the rectified input voltage Vrect.

These operations continue until all of the comparators C81 to C83 are switched low and all sets S1 to S3 of light emitting devices are energized.

Figure 9:
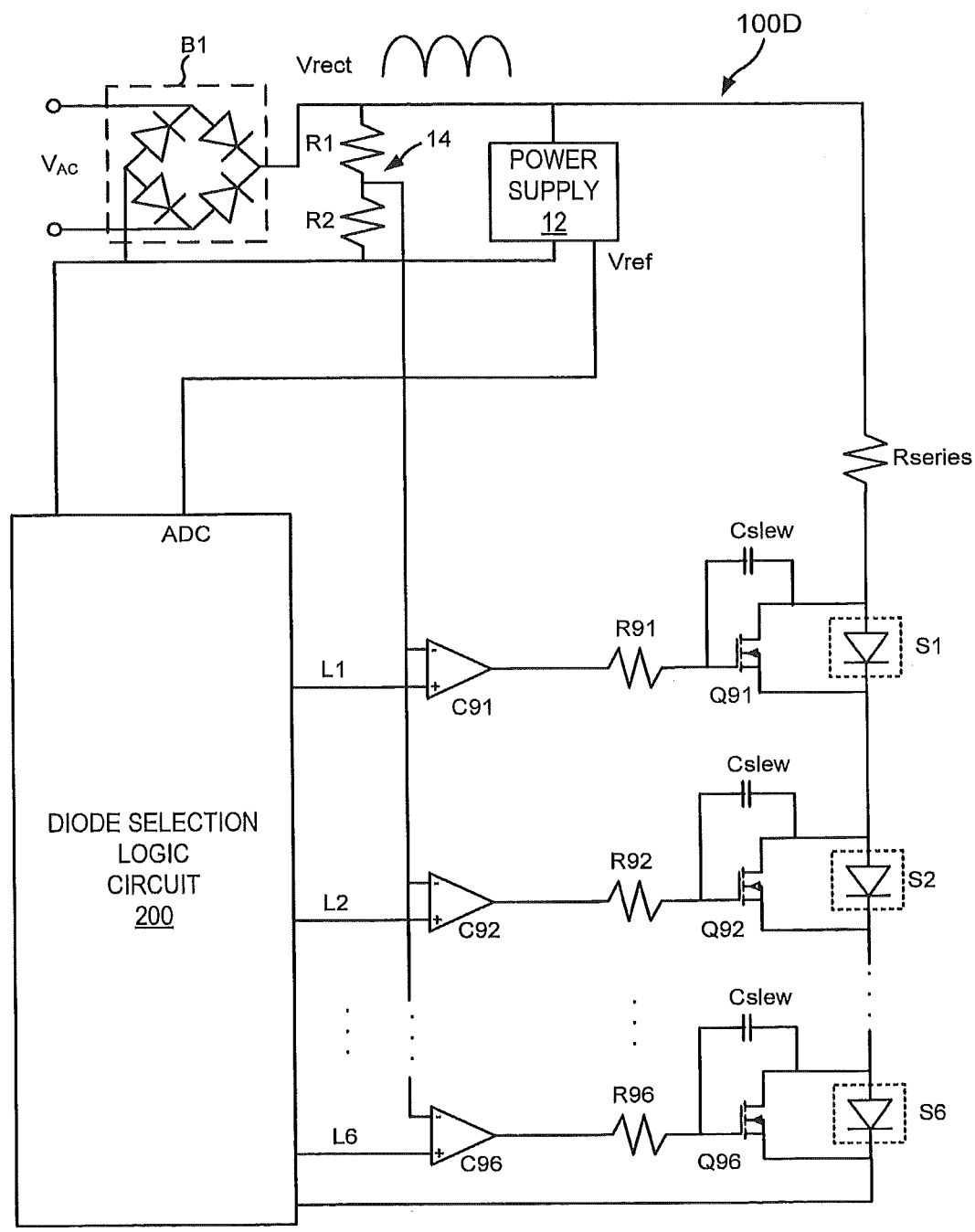

Further embodiments of the invention are illustrated in FIG. 9, which illustrates an LED drive circuit 100D including a diode selection logic circuit 200 that is coupled to a plurality of comparators C1 to C6 through control lines L1 to L6. The outputs of the comparators control the conductivity of respective bypass switching transistors Q91 to Q96, which bypass respective sets of LEDs S1 to S6. The operation of comparators C91 to C96, transistors Q91 to Q96 and sets of LEDs S1 to S6 is similar to the corresponding elements described above with respect to FIG. 7. However, the circuit illustrated in FIG. 9 uses a series resistor Rseries to regulate current through the LED string.

The diode selection logic may be implemented in some embodiments as a programmed microcontroller that includes an integrated analog to digital converter, such as the PIC 16F88 microcontroller manufactured by Microchip Technology Inc. However, it will be understood that the diode selection logic circuit 200 can be implemented as an application specific integrated circuit (ASIC) or with discrete circuitry.

The diode selection logic circuit 200 may be configured to selectively bypass one or more sets of LEDs in response to a voltage level of the reference voltage Vref sensed at an ADC input to the diode selection logic. In particular embodiments the diode selection logic circuit 200 may be configured to switch the sets S1 to S6 using Binary Weighted Switching as described below.

Using Binary Weighted Switching, the LED current is given by:

$$Vrect(t)=Vpeak*|\sin(2*\pi*Fac*t)|-2*Vf$$

$$Vr\_series=Vrect(t)-floor([Vrect(t)-Vdrop]/Vled)*Vled$$

$$I_{LED}(t)=[Vrect(t)-floor([Vrect(t)-Vdrop]/Vled)*Vled]/Rseries$$

Assuming a peak voltage of 163V and 3V LEDs, a binary switched approach would use 64 LEDs, allowing the lamp to operate up to 137 Vrms, and 6 switches. In a binary switched approach, Set 1 includes 1 LED, Set 2 includes 2 LEDs, Set 3 includes 4 LEDs, Set 4 includes 8 LEDs, Set 5 includes 16 LEDs and Set 6 includes 32 LEDs. Accordingly, transistor switch Q1 (corresponding to the least significant bit of the control word) would switch one LED, and while transistor switch Q6 (corresponding to the most significant bit of the control word) would short 16 LEDs.

Switches Q1-Q6 are operated in a binary manner, choosing n(t) such that n(t)*Vled=Vac(t)-Vdrop. A simple way to do this would be to use a 6-bit A/D converter, driven by a voltage divider from the DC bus. A small zener diode or LED in series with the top of the voltage divider may be used to set Vdrop, and each of the ADC outputs directly drive the switches through inverters—when the ADC bit is 1 the relevant switch is off, when the ADC bit is zero the switch is ON. Accordingly, the diode selection logic circuit can, in some embodiments, simply include and appropriately configured analog to digital conversion circuit.

Returning to the previous example, assuming Vdrop=3V and t=2 ms, then:

$$Vac(t)=163*\sin(2*\pi*60*2\ ms)=122.9V$$

$$Vrect(t)=|Vac(t)|-2*Vf=120.9V\ \text{is the DC bus}$$

$$[Vrect(t)-Vdrop]/VLED=39.3$$

The voltage divider and ADC reference voltage will be selected such that the peak DC bus voltage gives an output of 111111 (all switches off) so the ADC output will be:

$$Nadc=floor([Vrect(t)-Vdrop]/VLED)=39=32+4+2+1=100111$$

*MSB* Switch Q6=OFF (LEDs 32-64 operating)

Switch Q5=ON (LEDs 16-31 short-circuited)

Switch Q4=ON (LEDs 8-15 short-circuited)

Switch Q3=OFF (LEDs 4-7 operating)

Switch Q2=OFF (LEDs 2, 3 operating)

*LSB* Switch Q1=OFF (LED 1 operating)

The total LED forward voltage is (16+4+2+1)*3V=117V and 3.9V is dropped across the series resistance Rseries.

The binary approach is not the only method of switch ordering, but it may result in high overall efficiency, although the gate drivers may be floating in such a circuit.

By its very design, the switched-LED approach has good efficiency. As mentioned above, a Binary Weighted Switching approach may theoretically gives high efficiency, as the LED string voltage can track the rectified AC line voltage with low error. However it has a two major disadvantages compared to Linear-Sequential Switching, namely, a much higher switching frequency, and fully floating switches requiring floating gate drivers.

The efficiency of a Linear-Sequential Switching circuit can be improved by driving the dynamically switched LED string with a Voltage Controlled Current Source, so that the LED current tracks the rectified AC line voltage. Assuming a reasonably sinusoidal AC supply, the VCCS drives the LEDs with:

$$Isource(t)=Ipeak*|\sin(2*\pi*Fac*t)|$$

Because the LED current is sinusoidal, it starts out at zero then ramps up sinusoidally, reaching a peak after 90 electrical degrees. The losses in the current source at any point are given by:

$$Psource(t)=[Vrect(t)-VLED\_string(t)]*Isource(t)$$

where:

$$Vdrop(t)=[Vrect(t)-VLED\_string(t)]$$

$$Isource(t)=Ipeak*|\sin(2*\pi*Fac*t)|$$

So the VCCS instantaneous power dissipation is:

$$Psource(t)=Vdrop(t)*Ipeak*|\sin(2*\pi*Fac*t)|$$

As the LED Segments are switched at discrete intervals, it is reasonable to consider the VCCS losses during each interval. The AC line period is long compared to the thermal time constant of the VCCS transistor(s), but short compared to typical heatsink time constants, so to reduce/minimize peak junction temperature, the average VCCS losses during each interval Psource_average[N] should be kept roughly constant.

When Isource(t) is small, keeping Psource_average[N] constant requires a large Vdrop(t). Conversely when Isource(t) is large, keeping Psource_average[N] constant requires a small Vdrop(t). Therefore in order to reduce/minimize the total number of switches and increase/maximize the efficiency, LED Segment voltages that are different should be chosen—large for the first few segments that are turned on and small for the last few. The following process can be used to choose LED groupings:

choose Tstart=0
choose Vstart=Vrect(Tstart)
    choose Nstart=Ntotal=total number of LEDs in the string
REPEAT
    choose some arbitrary number of LEDs Nmax for the uppermost segment
    for each N=1, 2 . . . Nmax calculate:
    The number of LEDs remaining Nleft=(Nstart−N) when N LEDs are switched OFF
    The voltage at which this occurs, Vstop=(Nstart−N)*VLED
    the time Tstop(N) at which Vrect(t)=Vstop
    the instantaneous VCCS losses during the interval Tstart−Tstop
    the average VCCS losses Psource_average[N] during this interval
    the percentage VCCS losses Psource_average[N]/Pin during this interval
    then display a column vector of each of the Nmax percentage losses
    Choose the value of N=Nopt which gives the desired % Loss
    This then is the number of LEDs in that segment, Nsegment=Nopt
    Choose Tstart=Tstop(Nsegment)
    Calculate Nstart=Nstart−Nsegment
UNTIL DONE As the algorithm starts when Isource(t) is maximum, the number of LEDs in the uppermost segment will be quite small, e.g. Nmax=3. However by the time the lower segments are reached, the number of LEDs may be quite high.

Binary-Weighted Switching places a number of constraints on both the FETs and gate drivers: FET voltage is also Binary Weighted—the MSB FET will switch half the LEDs, so must be rated at least half of the peak DC bus voltage; the LSB FET will switch only one or two LEDs so can be very low voltage.

Binary-Weighted FETs switch on and off constantly—the LSB FET has the highest switching frequency, halving for the next bit and so on down to the MSB FET, which has the lowest switching frequency.

Because of this switching behavior, the peak current rating seen by each FET during a quarter-linecycle can be calculated as follows:

The MSB FET turns OFF and stays OFF once Vrect(t) and hence Isource(t) are above h. The peak current is therefore 0.5*Isource_peak.

The next most significant bit FET turns OFF and stays OFF once Vrect(t) and hence Isource(t) are above 75%. The peak current is therefore 0.75*Isource_peak and so on, down to the LSB, which is switching furiously right up until the peak of Vrect(t) and Isource(t), so its peak current is 1.0*Isource_peak.

Assuming a 6-bit ADC, the percentage currents are:
Bit 5=50.0%
Bit 4=75.0%
Bit 3=87.5%
Bit 2=93.8%
Bit 1=96.9%
Bit 0=98.4%

As the ADC resolution increases the MSB rating stays the same and the extra LSBs get closer and closer to 100%. Therefore almost all of the FETs in a Binary-Weighted Switching scheme need to be rated for the peak current. This increases/maximizes both Qg and $C_{DS}$ which is unfortunate, as the switches with the highest current also switch at the highest frequency.

Finally, all but one of the FET gate drives must be completely floating, although one can sit at the low side of the DC bus.

By its very design, the switched-LED approach generates very low electromagnetic interference (EMI)—there are no switching power supplies, very little switching of LEDs occurs, and the LEDs are switched smoothly. In this respect Linear-Sequential Switching may be best—with a total of N segments, there are no more than N switching instants per quarter-cycle, as a segment is not switched ON until the voltage dropped across the current source exceeds the segment voltage, then stays ON for the rest of the quarter-cycle.

$F$switch_linear=4*Fac*Nsegments

For a circuit with a total of 8 segments, there are 8 switching events per quarter cycle, giving:

$F$switch_linear=4*50 Hz*8 segments $F$switch_linear=1.6 kHz

Note that EMI scans typically start at 150 kHz. Even if the switching edges are fast enough to fall within the conducted EMI limits, the duty cycle is so low that the total amount of energy involved is miniscule. The amount of EMI filtering required for Linear-Sequential Switching will be negligible. However with Binary-Weighted Switching within one quarter line cycle there will be a switching instant every time the voltage dropped across the current source exceeds one LSB, which is the smallest segment voltage:

$F$switch_linear=4*Fac*Vrect_peak/Vsegment_min

Assuming a peak DC bus voltage of 165V and an LSB of 1 LED=3V this gives:

$F$switch_linear=4*50*165V/3V $F$switch_linear=11 kHz

This is more than 10× higher the switching frequency of a similar Linear-Sequential Switching approach, but still more than an order of magnitude below the start of a conducted EMI scan. The amount of EMI filtering required for Binary Weighted Switching will be much greater than that required for Linear-Sequential Switching, but should still be negligible.

The slope of the switching edges can also be controlled by connecting a capacitor Cslew between the MOSFET Drain and Gate, as illustrated in FIG. 7. Current flowing through Cslew is proportional to the Drain voltage slew-rate, and opposes the current flowing in from the Gate resistor Rgate. Rgate and Cslew can be designed to produce a wide range of desired slew rates.

In designing an LED apparatus, it may be important to consider color control, which can be affected by temperature variations. By its very design, the switched-LED approach means different LEDs are ON for different amounts of time. Provided the LEDs are all tightly thermally coupled (e.g. using an MCPCB) they will be at the same temperature.

The VCCS current source illustrated in FIG. 3B above can be designed to have essentially any arbitrary temperature coefficient (linear or otherwise), by controlling the diode D1 voltage drop and/or using combinations of linear resistors, negative temperature coefficient (NTC) and/or positive temperature coefficient (PTC) thermistors for the current source resistors R1 & R2. Assuming the sensing elements are also tightly coupled to the LEDs, the LED Current vs Temperature curve can be controlled. Of course the LED current varies widely over a half-cycle, so the actual LED color may be somewhat harder to control. If however a segment comprises a series-parallel array of, for example, BSY and red LEDs with a shunt current-flow controller to control the ratio of BSY to red current, full color control can be attained (and the current source temperature coefficient may simplify the design).

A VCCS current source according to some embodiments may inherently provide excellent power factor and total harmonic distortion (THD). However as the input line voltage varies, so too does the LED current. An LED lamp will be designed for some specific optical output, efficiency and input power at some nominal voltage. As the RMS input voltage varies, so too does the current and hence power. The current source looks like an equivalent resistor of:

Req=R3*(1+R2/R1)

The input power and current is thus:

Pin=$V$rms$^2$/Req

Irms=$V$rms/Req

A 10% drop in input voltage therefore gives a 10% drop in input current and a 19% drop in input power. Conversely a 10% rise in AC line voltage gives a 10% rise in input current and a 21% increase in input power. This will affect the color balance of the apparatus. In an apparatus including both BSY and red strings, shunt current flow controllers can correct the color balance by adjusting the ratio of BSY to Red LED current.

However, if the current source is made to be adjustable, it is possible to adjust Isource(t). Using thermistors as part of the R1-R2 network is one way of achieving this by adjusting Isource(t) as a function of temperature. If it is desired to keep the input power constant over a given voltage range, the current source must be adjusted such that Pin=Pconstant. This leads to:

$$Req = R3*(1+R2/R1) = Vrms^2/Pconstant$$

There are a number of ways that this can be done, either analog or digital. One way of doing this would be to choose:

$$R3 = Vrms^2/k$$

giving:

$$Pconstant = Vrms^2/[(Vrms^2/k)*(1+R2/R1)]$$

$$Pconstant = k/(1+R2/R1)$$

An analog approach involves measuring $Vrms^2$ indirectly, e.g. using a fast-attack-slow-decay envelope detector, to measure the long-term average peak DC bus voltage Vpeak_avg then squaring it and using $(Vpeak\_avg)^2$ as the setpoint for a voltage controlled resistor in parallel with a much larger R3', which now sets the minimum operating current. Making R3 adjustable is more difficult than adjusting either (or both) R1 & R2, as R3 carries the full load current. However the adjustment is linear with respect to $(Vpeak\_avg)^2$. Alternatively, it is possible to adjust either (or both) of the divider resistors R1 & R2 as follows:

$$Pin = (1+R2/R1)*Vrms^2/R3 = Pconstant, \text{ which requires:}$$

$$(1+R2/R1)*Vrms^2 = Pconstant*R3,$$

which re-arranges to:

$$(R1+R2)/R1 = Pconstant*R3/Vrms^2$$

The voltage divider itself adds further nonlinearities. It may be difficult and/or unnecessary to adjust both R2 and R1. If the control circuitry is referenced to 0V, R2 can be made adjustable with little extra circuitry, again by placing a VCCS in parallel with a much larger R2', which once again sets the minimum operating current. Re-arranging further still yields:

$$R2 = [Pconstant*R3*R1/Vrms^2] - R1$$

The required adjustment is non-linear, and may require more analog circuitry, the need for which is at least partially offset by the much lower currents involved. If a microcontroller with ADC is used to control the switch signals, this adjustment is fairly straightforward.

Typically, a microcontroller already has an ADC and a reference, with which it can measure an attenuated version of the DC bus:

$$VADC(t) = Vrect(t)*\square 1$$

where $\square 1$ is the attenuation factor of the DC bus sensing network. The absolute minimum sample rate required to generate Linear-Sequential Switching signals is Nsegment samples per quarter-cycle, giving:

$$Fsample\_linear \geq \square 4*Fac*Nsegment$$

where Nsegment is the total number of LED segments. So 10 segments at 60 Hz requires:

$$Fsample\_linear \geq \square 2400 \text{ Samples}/s$$

The minimum ADC resolution required is given by the ratio of peak DC bus voltage to minimum segment voltage. The simulations above use 165V and 5.6V respectively, giving:

$$ADCresolution\_linear > \log_2(Vrect\_peak/Vsegment\_min)$$

$$ADCresolution\_linear > \log_2(165V/5.6V) > 4.88 \text{ bits}$$

This minimum value sets one LSB=minimum segment voltage. If we choose, say, to measure the minimum segment voltage to an accuracy of not less than $\square\square (0 \leq \square\square < 1)$, we need to add more bits:

$$ADCresolution\_linear \geq \log_2(Vrect\_peak/(Vsegment\_min)) - \log_2(\square)$$

If Vsegment_min is measured to within 10% ($\square\square = 0.1$), then $ADCresolution\_linear \geq \log_2(165V/5.6V) - \log_2(0.1) \geq 4.88 + 3.32 = 8.2$ bits.

Binary-Weighted Switching requires far higher sample rates, governed by the ratio of peak DC bus voltage to LSB segment voltage:

$$Fsample\_binary \geq \square 4*Fac*(Vrect\_peak/VLSB)$$

Assuming a peak Dc bus voltage of 165V and an LSB of 1 LED=3V this gives:

$$Fsample\_binary \geq \square 013200 \text{ Samples}/s$$

The ADC resolution, as with linear switching, is given by the ratio of peak DC bus voltage to the LSB voltage multiplied by the required tolerance $\square$. If we set 1 LSB=1 LED and $\square\square\square = 0.1$ (10%) this gives:

$$ADCresolution\_binary \geq \log_2(Vrect\_peak/VLSB) - \log_2(\square)$$

$$ADCresolution\_binary \geq \log_2(165V/3V) - \log 2(0.1) \geq 5.78 + 3.32 = 9.1 \text{ bits}$$

In practice an 8-bit ADC would suffice for either linear-sequential or binary-weighted switching. Modern microcontrollers make it trivial to achieve sample rates in excess of 10 kS/s, with 8- or 10-bit ADCs.

Assuming the VCCS is implemented using a microcontroller with ADC generating the switching signals, it is fairly simple (and inexpensive) to get the microcontroller to control the LED string current. First the current source is changed to a current mirror. Using a high-gain Sziklai pair as illustrated in FIG. 3D and D1 for thermal compensation ensures that the voltage across R3 is equal to the voltage across R1. If R2 is replaced with an adjustable current sink, the voltage across R1 is:

$$VR1 = Isink*R1$$

But this is equal to the voltage across R3, so:

$$Isource = Isink*R1/R3$$

So the current source has been converted into a Current Mirror with gain $$\square 1 = R1/R3 \gg 1$$

An adjustable current sink according to some embodiments can therefore operate at a much lower current than the current mirror, and can be both small and cheap. In practice we would increase R2 to R2' rather than removing it, and connect the adjustable current sink in parallel with R2. This ensures the current source always operates, regardless of the current sink setpoint, which is mandatory if a non-switched pair of LEDs is used at the bottom of the string as our controller power supply.

Figure 10:
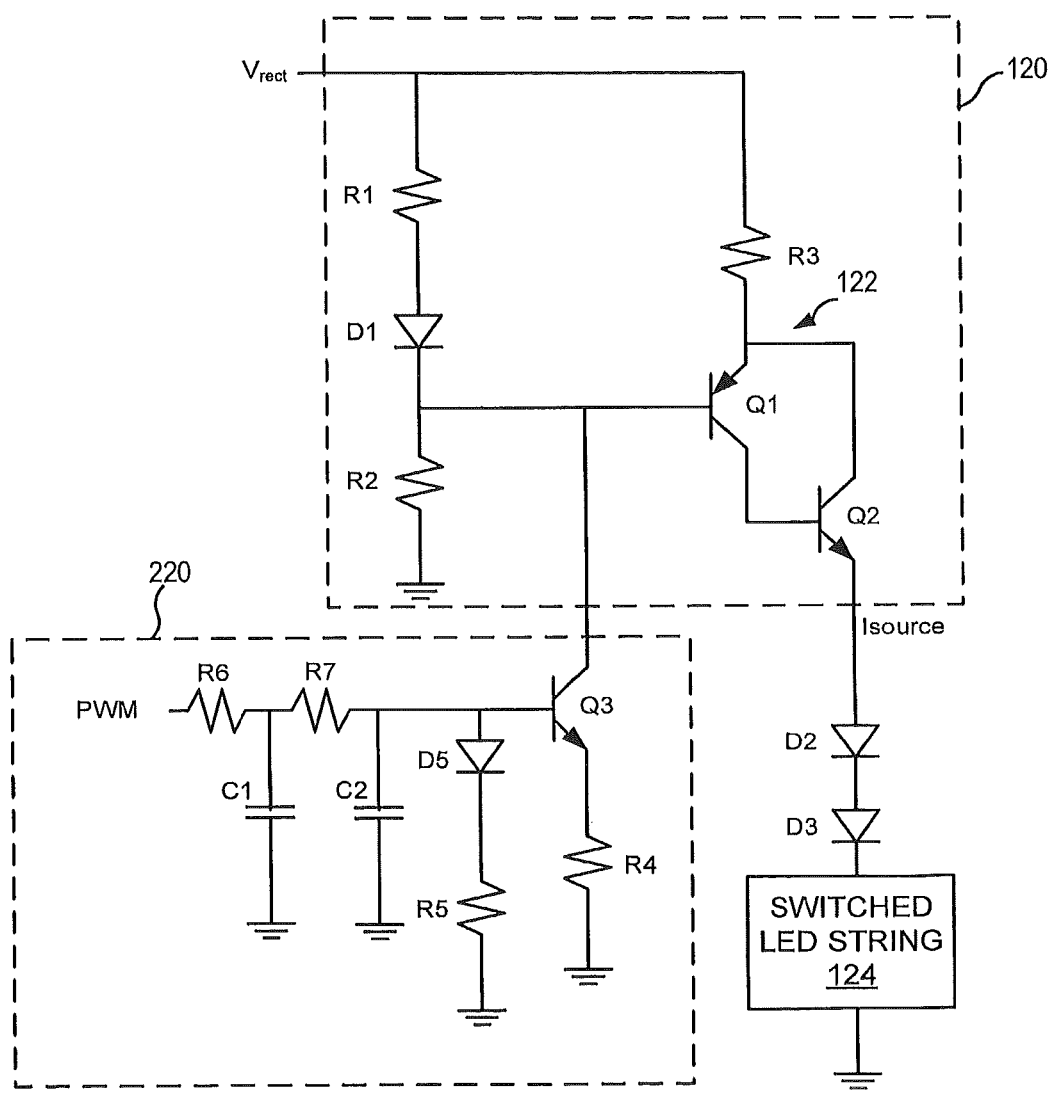
FIG. 10 is a schematic circuit diagram illustrating a voltage controlled current sources with an adjustable current sink for a solid state lighting apparatus in accordance with some embodiments of the invention.

An adjustable current sink circuit 220 according to some embodiments is illustrated in FIG. 10.

Referring to FIG. 10, R6-C1 and R7//R5-C2 form a second-order low pass filter (LPF), converting the high-frequency pulse width modulation (PWM) signal into a scaled, smoothed analog level Vbase. D5 thermally compensates the Q3 base-emitter junction, and R4 converts Vbase into Isink. If the microcontroller has a DAC, the PWM filter may be omitted.

Assuming Isource_peak=74 mA, R3=22R, and R1=2.4 k, $\square$1=2.4 k/22=109 and Isink_peak=74 mA/109=0.678 mA The transfer function of the adjustable current sink 220 shown above is roughly:

$I \text{sink}=1.49 \text{ mA}*D-0.424 \text{ mA for } 0.285<=D<=1$, and $I \text{sink\_max}=1.07 \text{ mA}$ Linearity is not as important as repeatability, as look-up tables can be used for linearization. If temperature is measured (many microcontrollers have this built in) it is possible to correct for thermal drift.

Allowing some headroom for Isink allows for calibration in the factory. The duty cycle required for 0.678 mA is thus:

$D\text{peak}=(I\text{sink\_peak}+0.424 \text{ mA})/1.49 \text{ mA}=0.739$

The duty-cycle to Source Current transfer function is:

$I\text{source}(D)=162.7 \text{ mA}*D-46.3 \text{ mA for } 0.285<=D<=1$

The DC Bus Voltage measured by the microcontroller is given by:

$V_{ADC}(t)=V\text{rect}(t)*\square 1$ $N_{ADC}=2^m*V_{ADC}(t)N\text{ref}=2^m*\square 1*V dc(t)/V\text{ef}$ Where $\square 1$ is the attenuation factor of the DC bus sensing network and Vref is the ADC reference voltage. As with the adjustable current sink, some headroom is required for calibration. The circuit is trying to emulate a constant resistance, given by:

$\text{Req}=V\text{rms}^2/P\text{in}$ which forces the input current to be: Irms=Pin/Vrms.

Vrms is moderately difficult to calculate, but peak quantities are trivial:

$I\text{peak}/\sqrt{2}=P\text{in}/(V\text{peak}/\infty 2)$ $I\text{peak}=2*P\text{in}/V\text{peak}$ All the necessary data and transfer functions to calculate the duty cycle (D) are thus available. First, the peak current is calculated:

$I\text{source\_peak}=2*P\text{in}/V\text{rect\_peak}$

The instantaneous current is therefore:

$I\text{source}(t)=I\text{source\_peak}*(V\text{rect}(t)/V\text{rect\_peak})$ $I\text{source}(t)=(2*P\text{in}/V\text{rect\_peak})*(V\text{rect}(t)/V\text{rect\_peak})$ $I\text{source}(t)=(2*P\text{in}/V\text{rect\_peak2})*V\text{rect}(t)$ Measuring Vrect_peak can be performed in software, for example using a fast-attack-slow-decay numerical envelope detector. At this point constant power operation may be implemented as follows:

$I\text{source}(t)=(2*P\text{constant}/V\text{rect\_peak2})*V\text{rect}(t)$

It is then straightforward to calculate the requisite duty cycle from the current sink transfer function:

$I\text{source}(D)=162.7 \text{ mA}*D-46.3 \text{ mA for } 0.285<=D<=1$

The duty cycle can be directly calculated as:

$D(t)=(I\text{source}(t)+46.3 \text{ mA})/162.7 \text{ mA}$ $D(t)=0.285+I\text{source}(t)/162.7 \text{ mA}$ The instantaneous duty cycle is thus:

$D(t)=0.285+V\text{rect}(t)*(2*P\text{constant}/V\text{rect\_peak2})/162.7 \text{ mA}$ Note that the term (2*Pconstant/Vrect_peak2)/162.7 mA need not be calculated every sample time, reducing processor overhead if required.

If constant input power is not maintained as the line voltage varies, the calculations are much easier:

$I\text{source}(t)=I\text{source\_peak}*(V\text{rect}(t)/V\text{rect\_peak})$ where Isource_peak is constant, and is given by $I\text{source\_peak}=2*P\text{in}/V\text{rect\_peak}$ giving:

$I\text{source}(t)=(2*P\text{in}/V\text{rect\_peak2})*V\text{rect}(t)$

Because it does not matter if the variation in AC line voltage causes changes in string current, both power and peak voltage can be assumed to be nominal values, giving:

$(2*P\text{in}/V\text{rect\_peak2})=(P\text{in\_rated}/V\text{rms\_rated2})$ $D(t)=0.285+V\text{rect}(t)*(P\text{in\_rated}/V\text{rms\_rated2})/162.7 \text{ mA}$ which reduces to:

$D(t)=0.285+Z*V dc(t)$, where Z=(Pin_rated/Vrms_rated2)/162.7 mA is a pre-defined constant. Assuming an 8-bit ADC is used, the entire calculation can be dropped into a single 256-byte Look-Up Table:

$D(t)=\text{LOOK\_UP\_TABLE}[N_{ADC}]$

Some possible choices of switches used to switch the LEDs in and out of the string are NPN Bipolar Junction Transistor (BJT), PNP BJT, N-Channel MOSFET and/or P-Channel MOSFETs.

BJTs require a continuous supply of base current to remain conducting once switched ON, whereas MOSFETs do not—once the gate-source capacitance (and the gate-drain capacitance) has been charged, a MOSFET will stay ON without drawing any gate current (assuming of course there is no external leakage path). MOSFETs are therefore a good choice for switching LED segments. However there are a few constraints. For example, the maximum Gate-source voltage, which is device dependant, is typically +20V. The minimum Gate-source voltage, which is also device dependant, is typically −20V.

High-voltage FETs have much higher RDS_ON than low-voltage FETs, and for a given voltage rating small FETs have much higher RDS_ON than large FETs.

Small FETs have much lower gate charge (Qg) than large FETs. Also, small FETs have much lower drain-Source capacitance ($C_{DS}$) than large FETs. Qg and $C_{DS}$ respectively are responsible for gate drive and switching losses.

For Linear-Sequential Switching, the switching frequency is very low, so Qg and $C_{DS}$ are not particularly important.

Some embodiments of the present invention are described above with reference to flowchart illustrations and/or block diagrams of methods, systems and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary That which is claimed is:

1. A circuit for a light emitting apparatus including a plurality of light emitting devices coupled in a series, the diode selection circuit comprising:
   a comparator configured to receive a rectified AC input signal and a reference voltage and to generate a control signal in response to comparison of the rectified AC input signal with the reference voltage;
   a voltage controlled current source configured to supply a current that is proportional to a voltage of the rectified AC input signal to the plurality of light emitting diodes in response to the rectified AC input signal; and
   a transistor configured to receive the control signal and to shunt current away from more than one of the plurality of light emitting devices in response to the control signal.

2. The circuit of claim 1, wherein the voltage controlled current source comprises a first PNP bipolar transistor, an emitter resistor coupled to an emitter of the first PNP bipolar transistor, a diode coupled to a base of the first transistor, a first resistor coupled to a first terminal of the diode and a second resistor coupled to a second terminal of the diode, and a terminal configured to receive the rectified AC input signal coupled to the emitter resistor and to the first resistor.

3. The circuit of claim 2, wherein a collector of the first PNP bipolar transistor is coupled to the series of light emitting devices.

4. The circuit of claim 2, further comprising a second transistor including a base coupled to a collector of the first PNP bipolar transistor and a collector coupled to the emitter of the first PNP bipolar transistor.

5. The circuit of claim 1, further comprising:
   an adjustable current sink coupled to the voltage controlled current source.

6. The circuit of claim 5, wherein the adjustable current sink is coupled to the base of the first PNP bipolar transistor.

7. The circuit of claim 6, wherein the adjustable current sink comprises a third transistor having a collector coupled to the base of the first PNP bipolar transistor and an emitter coupled to ground, and a diode coupled to a base of the third transistor.

8. The circuit of claim 7, wherein the base of the third transistor is configured to receive a pulse width modulation (PWM) control signal configured to control a conductivity of the third transistor.

9. The circuit of claim 1, wherein the diode selection circuit is configured to shunt current away from the at least one light emitting device in response to a voltage level of the rectified AC input signal being below a threshold level.

10. The circuit of claim 1, wherein the switch comprises a field effect transistor, and wherein the control signal is applied to a gate of the field effect transistor.

11. The circuit of claim 10, wherein the switch further comprises a second transistor coupled in a cascode configuration with the field effect transistor so that conductivity of the second transistor is controlled by the field effect transistor.

12. The circuit of claim 11, wherein the second transistor comprises a bipolar transistor including a base, a collector and an emitter, and wherein a drain of the field effect transistor is coupled to the emitter of the bipolar transistor, and the collector of the bipolar transistor is coupled to an anode of the at least one light emitting device.

13. The circuit of claim 12, further comprising a resistor coupled between the drain of the field effect transistor and the emitter of the bipolar transistor.

14. A circuit for a light emitting apparatus including a plurality of light emitting devices coupled in a series, the diode selection circuit comprising:
   a comparator configured to receive a rectified AC input signal and a reference voltage and to generate a control signal in response to comparison of the rectified AC input signal with the reference voltage;
   a voltage controlled current source configured to supply a current to the plurality of light emitting diodes that is proportional to the rectified AC input signal;
   a switch configured to receive the control signal and to shunt current away from at least one of the plurality of light emitting devices in response to the control signal; and
   an adjustable current sink coupled to the voltage controlled current source, wherein the adjustable current sink is configured to be controlled in response to a pulse width modulation (PWM) signal.

15. A circuit for a light emitting apparatus including a plurality of light emitting devices coupled in a series, the diode selection circuit comprising:
   a comparator configured to receive a rectified AC input signal and a reference voltage and to generate a control signal in response to comparison of the rectified AC input signal with the reference voltage;
   a voltage controlled current source configured to supply a current that is proportional to a voltage level of the rectified AC input signal to the plurality of light emitting diodes in response to the rectified AC input signal; and
   a switch configured to receive the control signal and to shunt current away from at least one of the plurality of light emitting devices in response to the control signal;
   wherein the voltage controlled current source comprises a first PNP bipolar transistor, an emitter resistor coupled to an emitter of the first PNP bipolar transistor, a diode coupled to a base of the first transistor, a first resistor coupled to a first terminal of the diode and a second resistor coupled to a second terminal of the diode, and a terminal configured to receive the rectified AC input signal coupled to the emitter resistor and to the first resistor.

* * * * *

UNITED STATES PATENT AND TRADEMARK OFFICE
CERTIFICATE OF CORRECTION

PATENT NO. : 9,131,569 B2  
APPLICATION NO. : 13/919528  
DATED : September 8, 2015  
INVENTOR(S) : van de Ven et al.

Page 1 of 1

It is certified that error appears in the above-identified patent and that said Letters Patent is hereby corrected as shown below:

In the specification
Column 1, Line 15: Please correct "components:" to read -- components. --
Column 7, Line 11: Please correct "and while" to read -- and white --
Column 7, Line 64: Please correct ""power chips."" to read -- "power chips"). --
Column 8, Line 13: Please correct "1G." to read -- 1C. --
Column 12, Line 28: Please correct "Vrect-Vied" to read -- Vrect-Vled --
Column 16, Lines 7 and 12: Please correct "100" to read -- 10C --
Column 22, Line 22: Please correct "013200" to read -- 13200 --
Column 22, Line 31: Please correct "$\geq 5.78$" to read -- $\geq \square 5.78$ --
Column 23, Line 28: Please correct "Nref" to read -- Vref --
Column 23, Line 28: Please correct "Vef" to read -- Vref --
Column 23, Line 39: Please correct "/∞2)" to read -- /√2 --

Signed and Sealed this
Second Day of August, 2016

Michelle K. Lee
*Director of the United States Patent and Trademark Office*